US011340341B2

(12) United States Patent
Yoon et al.

(10) Patent No.: US 11,340,341 B2
(45) Date of Patent: May 24, 2022

(54) ELECTRONIC DEVICE FOR PERFORMING RANGING BY USING ULTRA-WIDE BAND AND OPERATION METHOD THEREOF

(71) Applicant: Samsung Electronics Co., Ltd., Suwon-si (KR)

(72) Inventors: Kangjin Yoon, Suwon-si (KR); Sehee Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/108,214

(22) Filed: Dec. 1, 2020

(65) Prior Publication Data

US 2021/0173066 A1 Jun. 10, 2021

(30) Foreign Application Priority Data

Dec. 6, 2019 (KR) ........................ 10-2019-0161838

(51) Int. Cl.
*G01S 13/02* (2006.01)
*H04W 64/00* (2009.01)
*H04L 9/06* (2006.01)
*H04B 1/7156* (2011.01)
*H04B 1/7143* (2011.01)

(52) U.S. Cl.
CPC ........ *G01S 13/0209* (2013.01); *H04B 1/7143* (2013.01); *H04B 1/7156* (2013.01); *H04L 9/0631* (2013.01); *H04L 9/0643* (2013.01); *H04W 64/00* (2013.01); *H04B 2001/71566* (2013.01)

(58) Field of Classification Search
CPC . G01S 12/0209; H04B 1/7143; H04B 1/7156; H04B 2001/71566; H04L 9/0631; H04L 9/0643; H04W 64/00
See application file for complete search history.

(56) References Cited

U.S. PATENT DOCUMENTS

| | | | |
|---|---|---|---|
| 8,879,407 | B2 | 11/2014 | Ekbal et al. |
| 9,154,267 | B2 | 10/2015 | He et al. |
| 2010/0202282 | A1 | 8/2010 | Kang et al. |
| 2010/0202303 | A1 | 8/2010 | Gu et al. |
| 2014/0064127 | A1 | 3/2014 | Kang et al. |
| 2019/0208387 | A1 | 7/2019 | Jiang et al. |

FOREIGN PATENT DOCUMENTS

| | | | |
|---|---|---|---|
| KR | 10-2014-0030981 | A | 3/2014 |
| KR | 10-1520775 | B1 | 5/2015 |

OTHER PUBLICATIONS

Apple Inc. et al., Digital Car Key—UWB MAC and Channel Access Specification, Aug. 8, 2019.
International Search Report dated Mar. 18, 2021, issued in International Application No. PCT/KR2020/017406.

*Primary Examiner* — Natasha W Cosme
(74) *Attorney, Agent, or Firm* — Jefferson IP Law, LLP

(57) ABSTRACT

A method of a first device which performs ranging by using an ultra-wide band (UWB) and the first device are provided. The method of the first device includes performing ranging with a second device in a first ranging round among a plurality of ranging rounds included in a first ranging block, determining whether to perform hopping, based on a result of the performing of the ranging, when it is determined to perform the hopping, determining an index of a second ranging round for performing ranging with a second device, based on a random-number generation function, and performing the ranging with the second device in the second ranging round of a second ranging block.

20 Claims, 20 Drawing Sheets

Frame Length
Slot Length
Ranging Round with Transmission Offset = 0
Ranging Round with Transmission Offset = S1
Ranging Round with Transmission Offset = S2
Ranging Round with Transmission Offset = S3
RCM
P1
R1
P*1
Ranging Round

FIG. 11

| Block i | 1 | 2 | 3 | 4 | 5 | 6 | 7 | 8 | ··· |
|---|---|---|---|---|---|---|---|---|---|
| S(i, ABCD, 10) | 6 | 10 | 1 | 2 | 7 | 5 | 9 | 8 | ··· |

FIG. 12

| Bits: 2 | 2 | 2 | 1 | 1 | 1 | 6 | 1 | Octets: 1 | 0/3 | 0/1 | 0/2 | 0/4 |
|---|---|---|---|---|---|---|---|---|---|---|---|---|
| Multnode Mode | Ranging Round Usage | STS Packet Config | Schedule Mode | Deferred Mode | Time Structure Indicator | RCM Validity Rounds | MMRCR | Content Control | Ranging Block Duration | Ranging Round Duration | Ranging Slot Duration | Session ID |

FIG. 13

| Octets: 2 | Bits: 1 | 15 | Octets: 2 |
|---|---|---|---|
| Ranging Block Index | Hopping Mode | Round Index | Transmission Offset |

ELECTRONIC DEVICE FOR PERFORMING RANGING BY USING ULTRA-WIDE BAND AND OPERATION METHOD THEREOF

CROSS-REFERENCE TO RELATED APPLICATION(S)

This application is based on and claims priority under 35 U.S.C. § 119(a) of a Korean patent application number 10-2019-0161838, filed on Dec. 6, 2019, in the Korean Intellectual Property Office, the disclosure of which is incorporated by reference herein in its entirety.

BACKGROUND

1. Field

The disclosure relates to an electronic device for performing ranging by using an ultra-wide band (UWB) communication technology and an operation method thereof.

2. Description of Related Art

The Internet is evolving from a human-centered connection network via which humans create and consume information to an Internet-of-Things (IoT) network via which information is exchanged and processed between distributed components, such as things. Internet-of-Everything (IoE) technology is also emerging, in which big data processing technology is combined with IoT technology via a cloud server or the like. To implement IoT, technical elements, such as detection technology, wired/wireless communication and network infrastructures, service interface technology, and security technology, are required. In recent years, research has been conducted on technologies, such as a sensor network, Machine-to-Machine (M2M), and machine-type communication (MTC), for connection between things.

In an IoT environment, intelligent Internet technology (IT) services may be provided to collect and analyze data obtained from connected objects to create new value in human life. As existing information technology (IT) and various industries converge and are combined with each other, IoT is applicable to the fields of smart homes, smart buildings, smart cities, smart cars or connected cars, smart grids, health care, smart home appliances, advanced medical services, or the like.

With the development of wireless communication systems, various services can be provided and thus, there is demand for a method of effectively providing such services. For example, a ranging technique for measuring the distance between electronic devices by using an ultra-wideband (UWB) may be used for medium access control (MAC). The UWB is a radio communication technology that uses a very wide frequency band of several gigahertz (GHz) or more in a base band without using a radio carrier.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a hopping sequence for ultra-wide band (UWB) ranging.

Additional aspects will be set forth in part in the description which follows and, in part, will be apparent from the description, or may be learned by practice of the presented embodiments.

In accordance with an aspect of the disclosure, a method of a first device which performs ranging by using an ultra-wide band (UWB) is provided. The method of operating the first device includes performing ranging with a second device in a first ranging round among a plurality of ranging rounds included in a first ranging block, determining whether to perform hopping, based on a result of performing ranging, when it is determined to perform hopping, determining an index of a second ranging round for performing ranging with a second device, based on a random-number generation function, and performing ranging with the second device in a second ranging round of a second ranging block, wherein an index of the first ranging round and the index of the second ranging round may be different values.

In accordance with another aspect of the disclosure, a method of a second device which performs ranging by using an UWB is provided. The method of operating the second device includes performing ranging with a first device in a first ranging round among a plurality of ranging rounds included in a first ranging block, determining whether to perform hopping, based on at least one of a result of performing ranging or information about a ranging round received from the first device, when it is determined to perform hopping, determining an index of a second ranging round for performing ranging with the first device, based on a random-number generation function, and performing ranging with the first device in a second ranging round of a second ranging block. An index of the first ranging round and the index of the second ranging round may be different values.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a table illustrating subsequent ranging rounds derived based on a random-number generation function according to an embodiment of the disclosure;

FIG. 12 is a diagram illustrating a configuration of information about ranging control according to an embodiment of the disclosure;

FIG. 13 is a diagram illustrating a configuration of information about a ranging round according to an embodiment of the disclosure;

Throughout the drawings, like reference numerals will be understood to refer to like parts, components, and structures.

DETAILED DESCRIPTION

Figure 1:
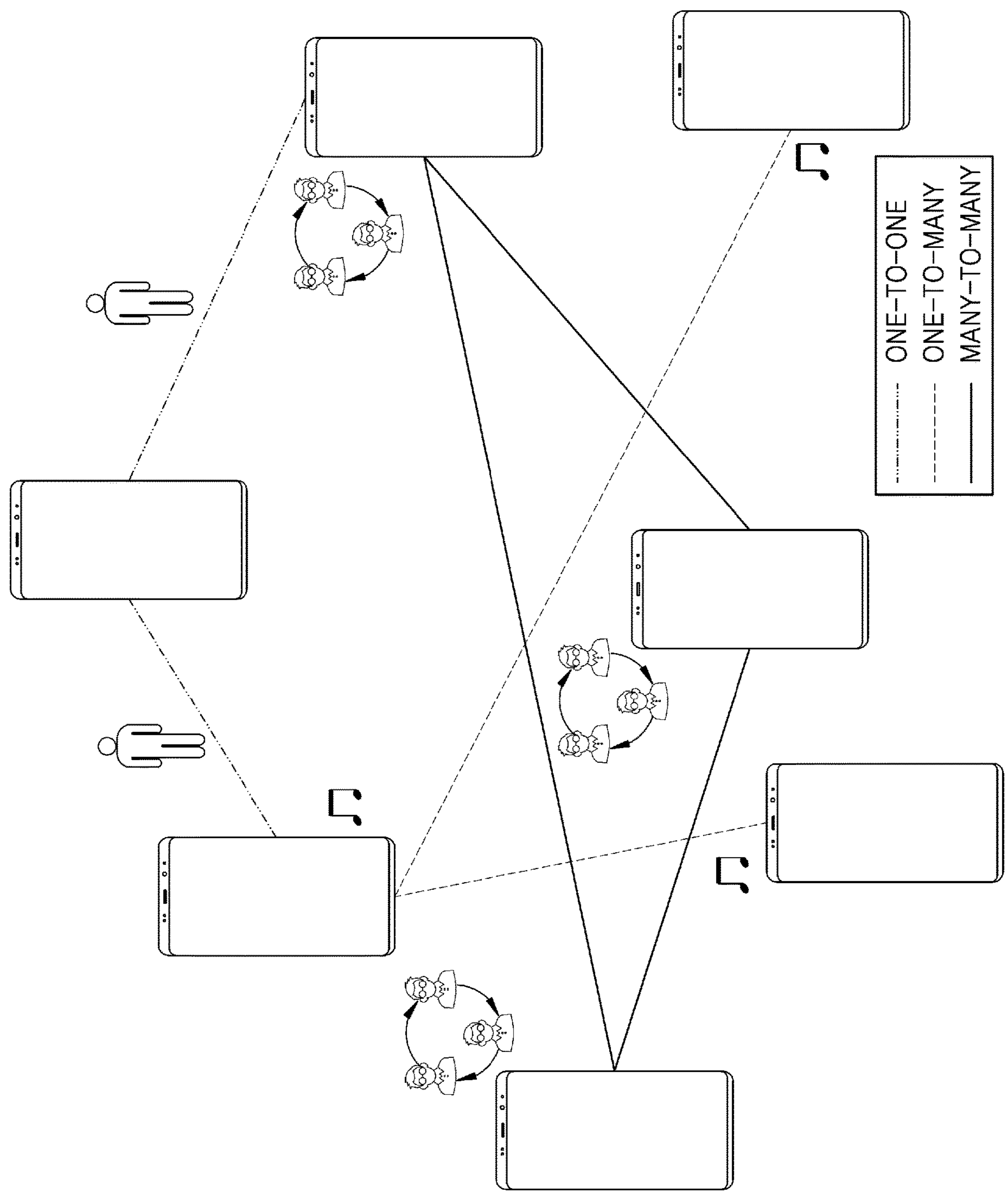
FIG. 1 is a diagram illustrating a general device-to-device (D2D) communication procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, general terms that have been widely used nowadays are selected, based on functions of the disclosure but various other terms may be selected according to the intentions of technicians in the art, precedents, or new technologies, or the like. Accordingly, the terms used herein should be defined not based on the names thereof but based on the meanings thereof and the whole context of the disclosure.

Terms, such as first and second may be used to describe various components but the components should not be limited by the terms. These terms are only used to distinguish one component from another.

The terms used herein are for the purpose of describing certain embodiments of the disclosure only and are not intended to be limiting of the disclosure. As used herein, the singular expressions are intended to include plural forms as well, unless the context clearly dictates otherwise. Throughout the specification, when an element is referred to as being "connected" to another element, it will be understood to include that the element is "directly connected" to the other element or is "electrically connected" to the other element with another element therebetween. It will be understood that when an element is referred to as "including" another element, the element may further include other elements unless mentioned otherwise.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

As used herein, "the" and similar referents may be used to indicate both singular and plural forms. When there is no description explicitly specifying an order of operations of a method according to an embodiment of the disclosure, the operations may be performed in an appropriate order. The disclosure is not limited to the order of the operations described.

The expression "in an embodiment" and the like appearing in various parts of the specification are not intended to refer to the same embodiment.

An embodiment of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing.

In addition, lines or members connecting elements illustrated in the drawings are merely illustrative of functional connections and/or physical or circuit connections. In an actual device, the connections between components may be represented by various functional connections, physical connections, or circuit connections that are replaceable or added.

In general, wireless sensor network technology is largely classified into wireless local area network (WLAN) and wireless personal area network (WPAN) according to a distance identified. In this case, WLAN is an institute of electrical and electronics engineers (IEEE) 802.11-based technology for connection to a backbone network within a radius of 100 m. WPAN is a technology based on IEEE 802.15, and examples thereof include Bluetooth, ZigBee, ultra-wide band (UWB), and the like. A wireless network in which such wireless network technology is implemented may include a plurality of communication electronic devices. In this case, the plurality of communication electronic devices establish communication in an active period using a single channel. For example, the plurality of communication electronic devices may collect and transmit packets in the active period.

UWB may refer to a short-range high-speed radio communication technology using a wide frequency band of several GHz or more, low spectral density, and a short pulse width (1 to 4 nsec) in a baseband state. UWB may be understood as a frequency band to which UWB communication is applied. A ranging method performed between electronic devices will now be described based on a UWB communication method, but the UWB communication method is only an example and various radio communication technologies may be used in practice.

Electronic devices according to embodiments of the disclosure may include a fixed user equipment (UE) embodied as a computer device or a mobile UE, and may communicate with other devices and/or servers using a wireless or wired communication method. For example, the electronic devices may include, but are not limited to, a smart phone, a mobile terminal, a laptop computer, a digital broadcasting terminal, a personal digital assistant (PDA), a portable multimedia player (PMP), a navigation device, or a slate person Computer (PC), a tablet PC, a digital television (TV), a desktop computer, a refrigerator, a projector, a car, a smart car, a printer, and the like.

Hereinafter, the disclosure will be described with reference to the accompanying drawings.

FIG. 1 is a diagram illustrating a general device-to-device (D2D) communication procedure according to an embodiment of the disclosure.

D2D communication refers to a way in which geographically adjacent electronic devices communicate directly with each other without via an infrastructure, such as a base station.

Referring to FIG. 1, electronic devices may communicate in a one-to-one manner, a one-to-many manner, or a many-to-many manner. In D2D communication, unlicensed frequency bands, such as wireless fidelity (Wi-Fi) Direct and Bluetooth may be used. Alternatively, in D2D communication, licensed frequency bands may be used to improve frequency utilization efficiency of cellular systems. Although D2D communication is restrictively used to refer to M2M communication or machine intelligent communication, in the disclosure, D2D communication is intended to refer to not only communication between electronic devices having a communication function but also communication between various types of electronic devices having a communication function, such as smart phones or personal computers.

Figure 2:
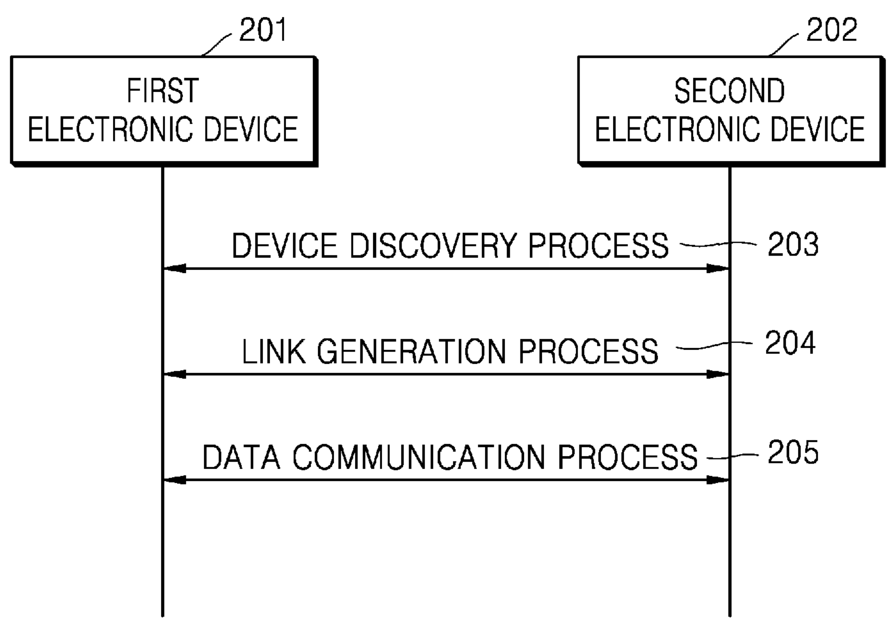
FIG. 2 is a diagram illustrating a process of communication between a plurality of electronic devices according to an embodiment of the disclosure.

FIG. 2 is a diagram illustrating a process of communication between a plurality of electronic devices according to an embodiment of the disclosure.

Referring to FIG. 2, a first electronic device 201 and a second electronic device 202 may establish communication through a device discovery process 203, a link generation process 204, and a data communication process 205.

In the device discovery process 203, each of the first electronic device 201 and the second electronic device 202 may search for other electronic devices capable of establishing D2D communication among neighboring electronic devices. Thus, each of the first electronic device 201 and the second electronic device 202 may determine whether to create a link for D2D communication. For example, the first electronic device 201 may transmit a discovery signal to the second electronic device 202 so that the second electronic device 202 may search for the first electronic device 201. In addition, the first electronic device 201 may receive a discovery signal transmitted from the second electronic device 202 to identify that that other electronic devices capable of establishing D2D communication are within a D2D communication range.

In the link generation process 204, each of the first electronic device 201 and the second electronic device 202 may create a link for data transmission with an electronic device, which is to transmit data, among the electronic devices searched for in the device discovery process 203. For example, the first electronic device 201 may create a link for data transmission with the second electronic device 202 searched for in the device discovery process 203.

In the data communication process 205, each of the first electronic device 201 and the second electronic device 202 may transmit data to and receive data from the devices for which the link for data transmission is created in the link generation process 204. For example, the first electronic device 201 may transmit data to and receive data from the second electronic device 202 through the link created in the link generation process 204.

Various embodiments of the disclosure relate to medium access control (MAC) based on D2D communication described above, and it is necessary to measure the distance between electronic devices for MAC. In this case, UWB ranging technology may be used to measure the distance between electronic devices. For example, when a digital key stored in a smart phone is used to open or close the door of a vehicle, the vehicle may measure the distance between the smartphone and the vehicle by using a number of UWB communication modules (e.g., six UWB communication modules) and estimate the location of the smart phone, based on a result of the measurement. The vehicle and the smart phone are capable of using multicast ranging or broadcast ranging.

An electronic device according to an embodiment of the disclosure may perform ranging using a ranging control frame. Two types of devices related to ranging control may be referred to as a "controller 100" and a "controller 200".

First, the controller 100 may be defined as a device that defines and controls ranging parameters by transmitting a ranging control frame together with a ranging control information element (IE). The ranging control frame is used to set ranging parameters.

The controllee 200 may be defined as a device that uses the ranging parameters received from the controller 100. At least one controllee 200 may be managed by the controller 100. A method of determining a role of a device (e.g., a role of a controller or a role of a controllee) and selecting ranging parameters may be implemented in various ways.

Two types of devices for ranging control may be referred to as an "initiator" and a "responder". The initiator refers to a device that starts ranging by sending a poll. The responder refers to a device that responds to the poll received from the initiator.

The controller 100 according to an embodiment of the disclosure is capable of determining devices to participate in ranging and device types by using a ranging initiator/responder list (IRL) IE or a ranging scheduling (RS) IE. The IRL IE and the RS IE may be transmitted in a ranging control frame. In the case of scheduling-based ranging, the RS IE may be configured by the controller 100 to manage resources and indicate roles of devices (i.e., a role of an initiator or a responder). The IRL IE may be used to determine roles of devices when the RS IE is not used in the case of contention-based ranging.

A schedule mode field of the ranging control IE indicates whether a ranging frame is transmitted using contention or a schedule. Devices that are not specified by such IEs cannot participate in ranging. When transmission of a poll frame by a device is required, a device type of the device may be determined as an initiator, whereas a device responding to the poll frame may be determined as a responder.

In the case of contention-based multicast/broadcast ranging, the controller 100 may be the only initiator in ranging and prevent an IRL IE from being added to a ranging control frame when a responder is designated in a destination address field included in a MAC header of the ranging control frame.

Because the ranging control frame includes the IRL IE or the RS IE, the controllee 200 may identify whether a poll is to be transmitted by receiving the ranging control frame. When a device type of the controllee 200 is designated as an initiator in the IRL IE or the RS IE, the controllee 200 may transmit a poll frame. Both the controller 100 and control 200 may serve as initiators or responders.

Figure 3:
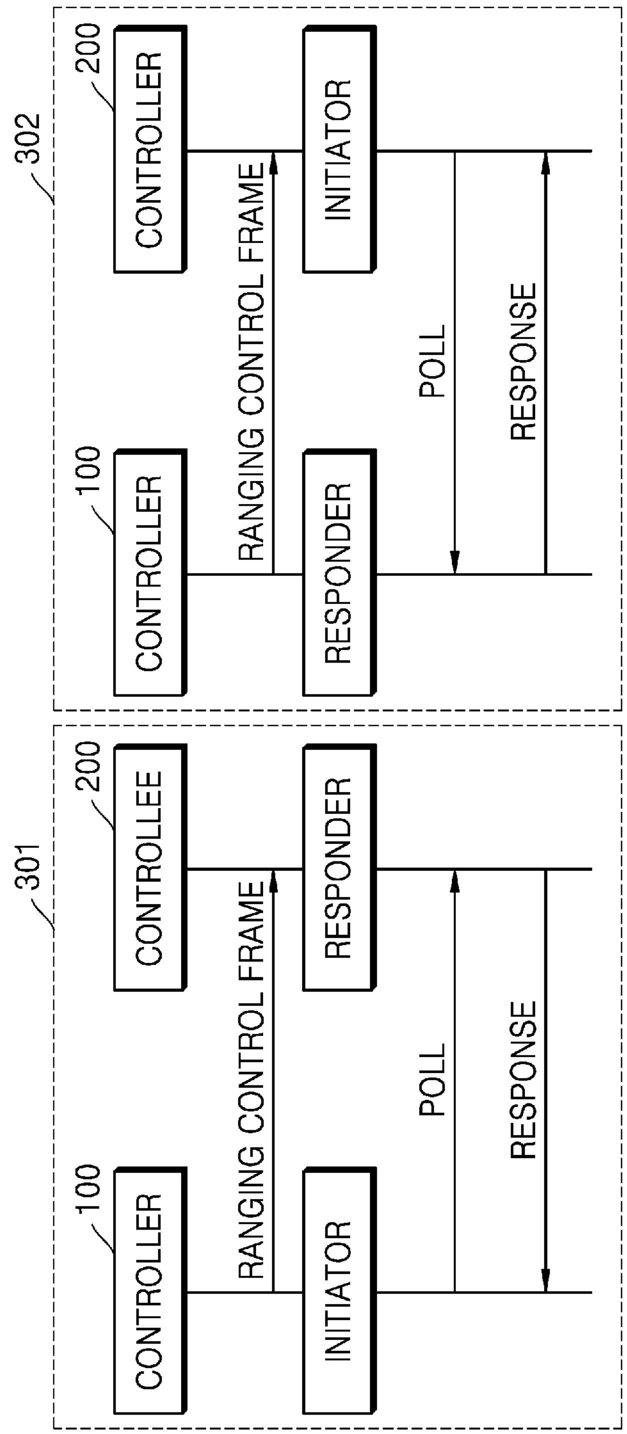
FIG. 3 illustrates examples of a single-sided two-way ranging (SS-TWR) using a ranging control frame according to an embodiment of the disclosure.

FIG. 3 illustrates examples of a single-sided two-way ranging (SS-TWR) using a ranging control frame. SS-TWR is one of various ranging methods introduced according to an embodiment of the disclosure.

Referring to FIG. 3, when a controller 100 is set to transmit a poll frame as illustrated in a flowchart 301 of FIG. 3, the controller 100 may serve as an initiator and transmit a poll frame. On the other hand, when a controllee 200 is set to transmit a poll frame as illustrated in a flow chart 302 of FIG. 3, the controllee 200 may serve as an initiator and transmit a poll frame.

The ranging control frame may include a ranging acknowledgment IE indicating a ranging response type. A plurality of controllees may be used for multicast/broadcast/M2M ranging.

A device according to an embodiment of the disclosure may perform ranging in units of ranging blocks.

The ranging blocks each represent a virtual time frame for ranging. The ranging blocks each consist of several ranging rounds. Each of the ranging rounds indicates completion of all ranging events between ranging devices of a UWB network. The ranging rounds each consist of several ranging slots. The ranging slots represent virtual time units for transmission of a ranging frame. The ranging blocks, the ranging rounds, and the ranging slots are based on virtual times and thus time-based synchronization is not required therefor.

Figure 4:
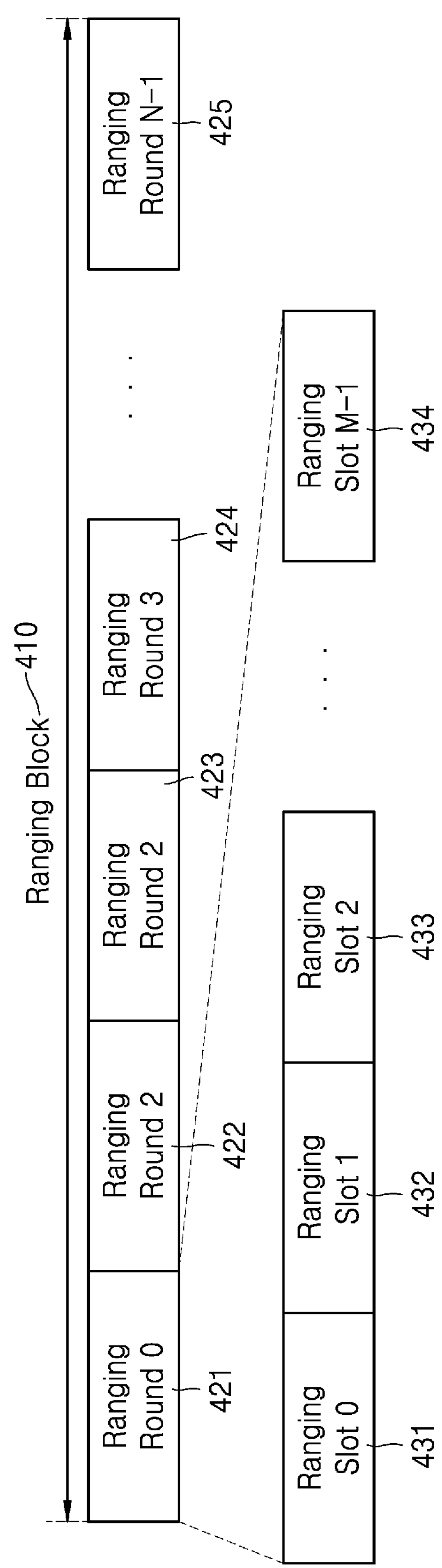
FIG. 4 illustrates a configuration of a ranging block according to an embodiment of the disclosure.

FIG. 4 illustrates a configuration of a ranging block according to an embodiment of the disclosure.

Referring to FIG. 4, a ranging block 410 may include N ranging rounds 421, 422, 423, 424, and 425. The ranging round 421 may include M ranging slots 431, 432, 433, and 434.

A time unit (TU) is defined as a minimum MAC time operation in PHY units. A ranging slot length is defined as an integral number of TUs. The ranging slot length is adjustable by a multiplier of a TU. The TU is fixed to 250 us which is an integer multiple of a reciprocal of a chipping rate of 499.2 megahertz (MHz). A ranging round is defined as an integral number of ranging slots. A duration of the ranging round is adjustable by a multiplier of a ranging slot. A ranging block length is defined as an integer multiple of MinimumBlockLength. The ranging block length is adjustable by a multiplier of Minimumblocklength. MinimumBlockLength is defined as an integer number of TUs.

According to various embodiments of the disclosure, two types of ranging modes (e.g., an interval-based mode ad a block-based mode) may be used for access control. A strict time structure is used in the block-based mode but is not used in the interval mode. The controller 100 may select one of modes and specify the selected mode by using a time structure indicator of a ranging control IE.

Figure 5:
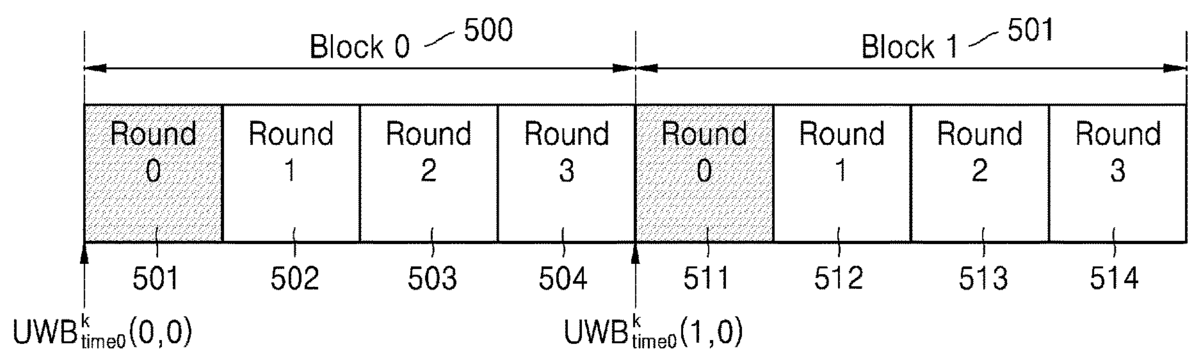
FIG. 5 is a diagram illustrating a block-based mode according to an embodiment of the disclosure.

FIG. 5 is a diagram illustrating a block-based mode according to an embodiment of the disclosure.

Referring to FIG. 5, in the block-based mode, a ranging block structure using a timeline, which is set at certain intervals of time, is used.

In the block-based mode, the ranging block structure may be determined based on a ranging block length field, a ranging round duration field, and a ranging slot length which are included in information about ranging control. The information about ranging control will be described with reference to FIG. 12 below. Hereinafter, for convenience of description, the information about ranging control will be referred to as a ranging control information element. In an embodiment of the disclosure, the information about on ranging control may be an advanced ranging control information element.

Equation 1 below is an equation for calculating a time duration from a ranging round with an index '0' of a ranging block with an index '0' to a ranging round with an index '0' of a ranging block with an index '1' in a $k^{th}$ session.

$$UWB_{time0}{}^{k}(i,0)=UWB_{time0}{}^{k}(0,0)+i\times T_{Block}{}^{k}\ i=1,2,\ \dots \qquad \text{Equation 1}$$

Equation 2 below is an equation for deriving the number of ranging rounds included in a ranging block.

$$\text{Number of Ranging Rounds} = \frac{\text{Ranging Block Duration}}{\text{Ranging Round Duration}} \qquad \text{Equation 2}$$

Equation 3 below is an equation for deriving the number of ranging slots included in a ranging round.

$$\text{Number of Ranging Slots} = \frac{\text{Ranging Round Duration}}{\text{Ranging Slot Duration}} \qquad \text{Equation 3}$$

When a device receives a ranging control message (RCM), the device may set a structure of a ranging block and a related timeline for ranging by using field values included in the ranging control information element. In another embodiment of the disclosure, the ranging block structure may be set by a next higher layer.

A controller may repeatedly transmit the ranging block structure in all ranging control messages. When the ranging block structure needs to be changed or updated, the controller may transmit a ranging block update IE (RBU IE) including fields related to updating of a ranging block.

Configurations of ranging blocks will be described with reference to FIGS. 4 and 5 below. Indexes of the ranging blocks may be set to increase sequentially, based on a first ranging block. In this case, as one example, a block index of the first ranging block may be 0, and block indexes of the ranging blocks may be set to increase by one.

Furthermore, indexes of ranging rounds in each of the ranging blocks may be set to increase sequentially, based on the first ranging round in the ranging block. For example, when M ranging rounds are included in a ranging block, a ranging round index of a first ranging round of the ranging block may be 0 and a ranging round index of a last ranging round of the ranging block is M−1.

Referring to FIGS. 4 and 5, indexes of ranging slots in each ranging round may be set to increase sequentially, based on a first ranging slot in each ranging round. In this case, for example, a ranging round index of the first ranging round may be 0. For example, when K ranging slots are included in a ranging round, a ranging slot index of a first ranging slot of the ranging round may be 0 and a ranging slot index of a last ranging slot of the ranging round may be K−1.

In this case, for example, the controller may transmit a first ranging control message in the first ranging slot (ranging slot index '0') of the first ranging round (ranging round index '0') included in the first ranging block (ranging block index '0').

To perform a range message exchange in the first ranging round, the controller may transmit a ranging control message packet in the first ranging slot.

In this case, the ranging control message may include a ranging round IE for signaling information about a ranging round of a current ranging block. The ranging round IE will be described with reference to FIG. 13 below.

Figure 6:
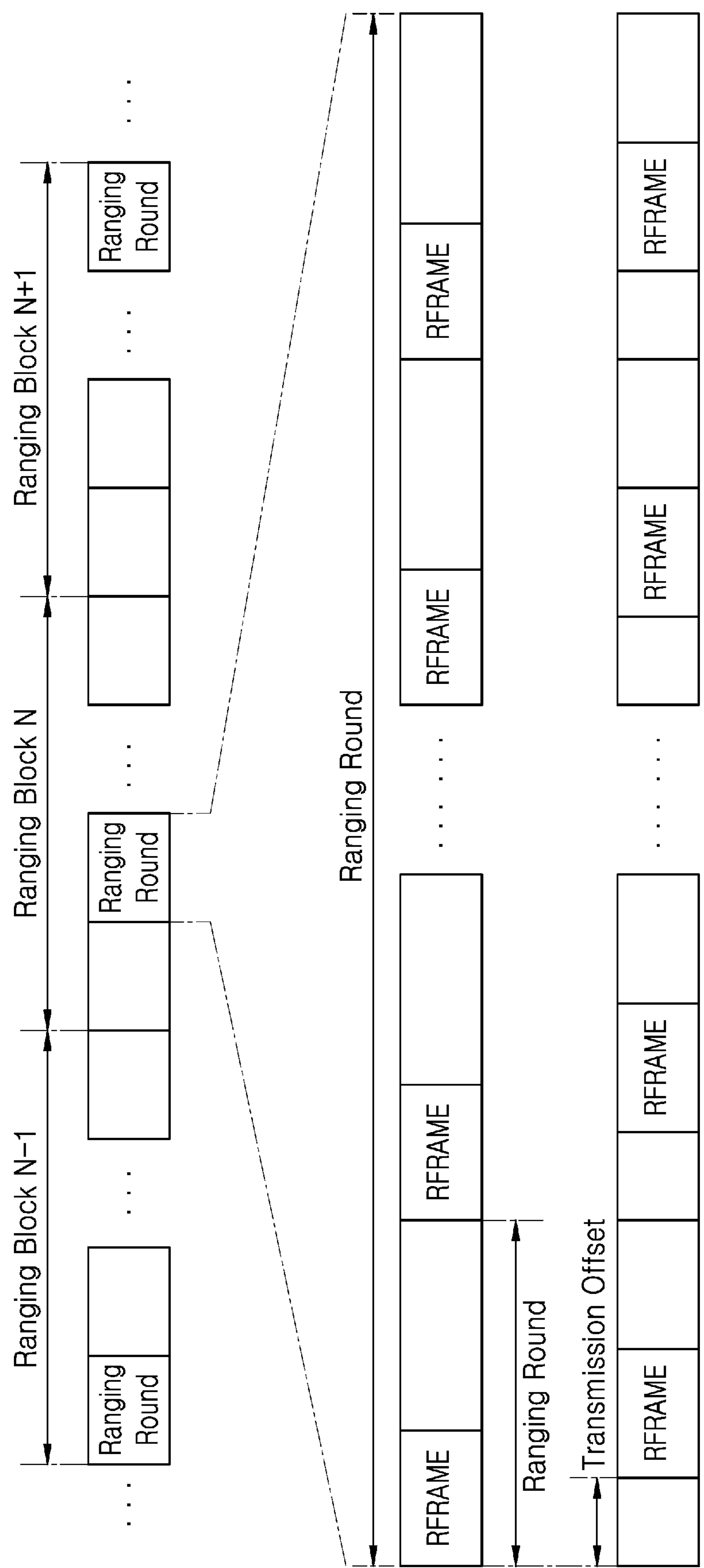
FIG. 6 is a timing diagram of a block-based mode according to an embodiment of the disclosure.

FIG. 6 is a timing diagram of a block-based mode according to an embodiment of the disclosure.

Referring to FIG. 6, it illustrates a ranging round included in a ranging block N. The ranging round includes several ranging slots. A ranging frame may be transmitted in the ranging slots. In addition, the ranging frame may be transmitted in the ranging slots by setting a transmission offset.

Figure 7:
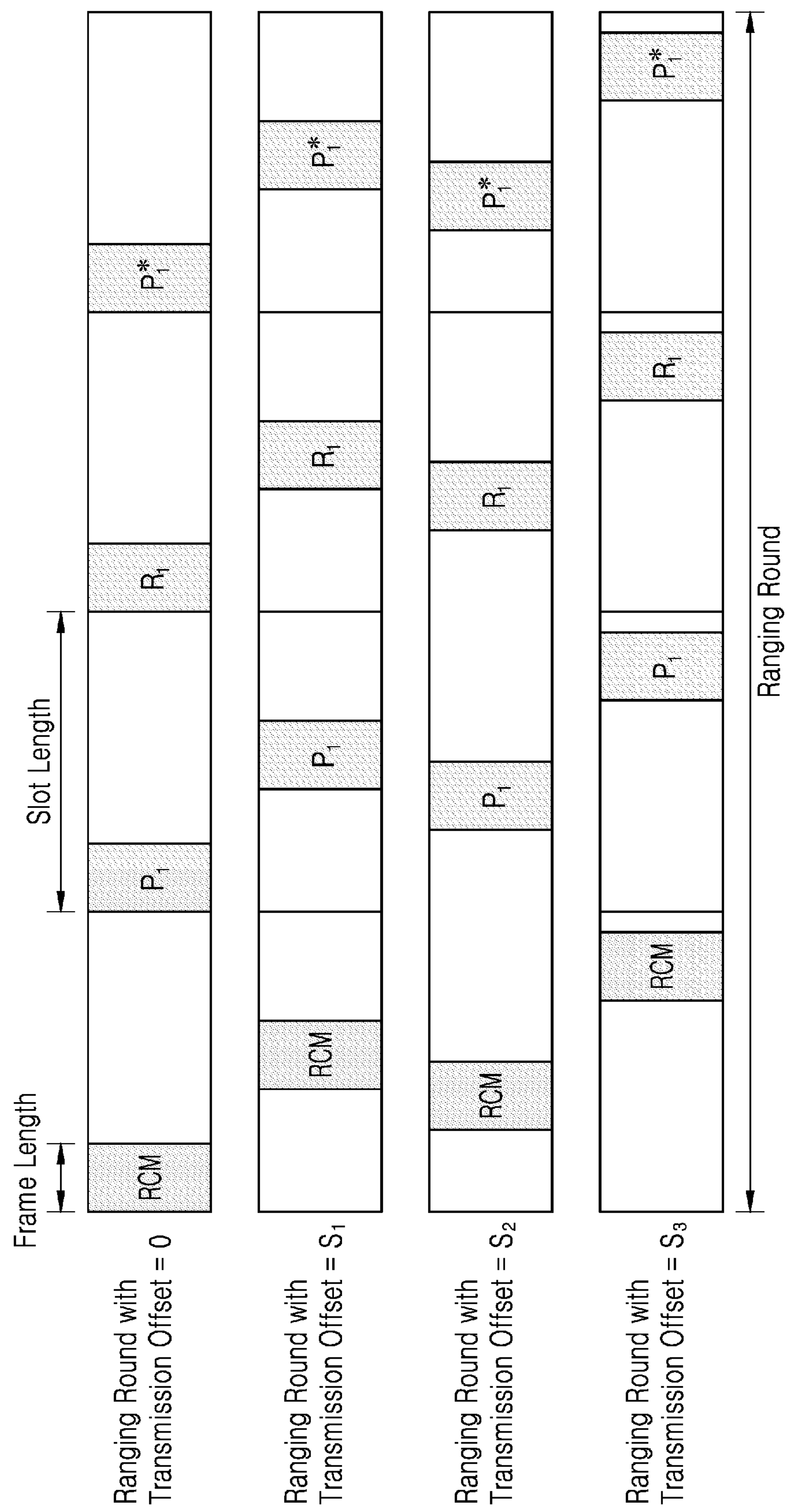
FIG. 7 is a diagram illustrating ranging slots to which different transmission offsets are allocated according to an embodiment of the disclosure.

FIG. 7 is a diagram illustrating ranging slots to which different transmission offsets are allocated according to an embodiment of the disclosure.

Referring to FIG. 7, in subsequent ranging rounds, a controller may determine to start transmission within ranging slots to which different transmission offsets are assigned. In this case, the controller may transmit, to a controllee, information about a transmission offset through a transmission offset field included in a ranging round IE. The transmission offset should be smaller than a result of subtracting a UWB packet duration from a duration of a ranging slot. The transmission offset may be expressed as a multiple of a ranging scheduling time unit (RSTU). All packets within the same ranging round should be transmitted with the same transmission offset.

Figure 8:
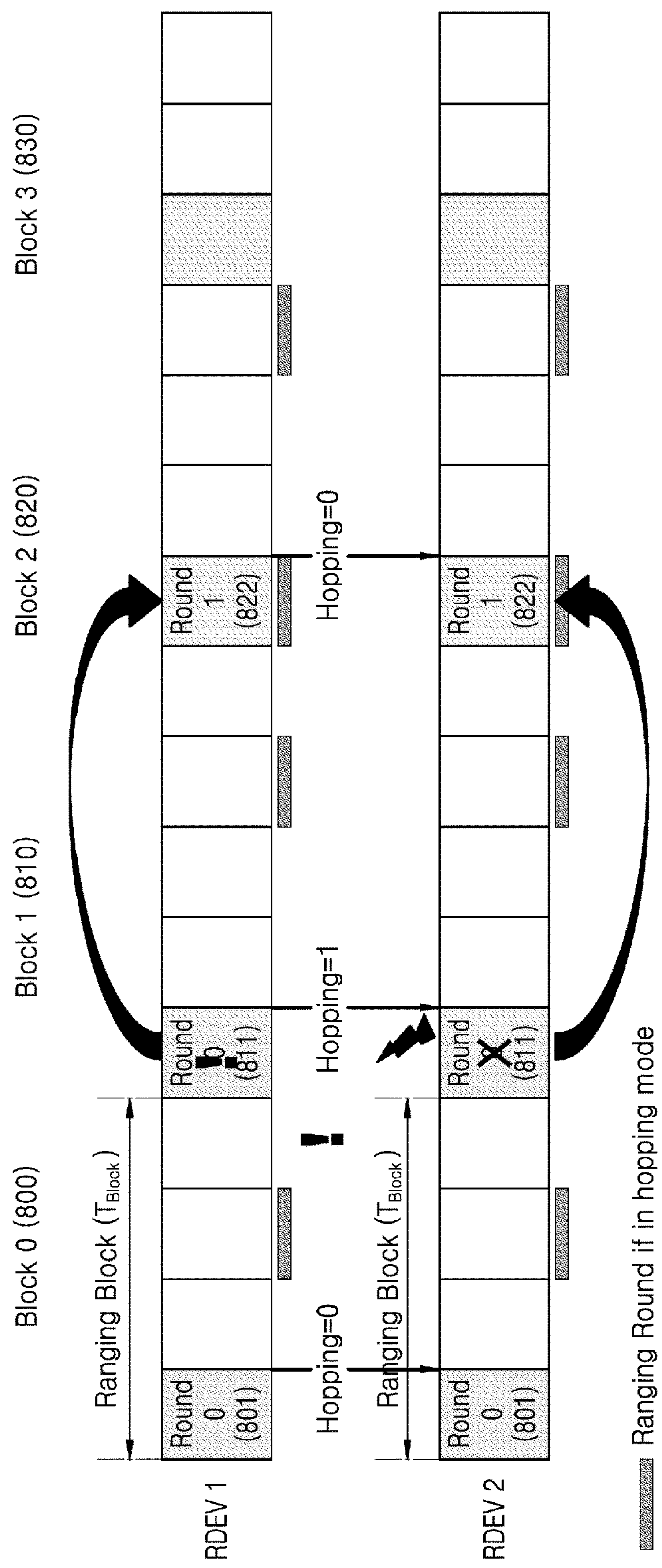
FIG. 8 is a diagram illustrating hopping in ranging according to an embodiment of the disclosure.

FIG. 8 is a diagram illustrating hopping in ranging according to an embodiment of the disclosure.

Hopping in UWB-based ranging may be understood to mean performing ranging in a predetermined round when it is not appropriate to perform ranging in a ranging round that is in use between devices. In this case, for example, a hopping sequence for performing hopping may be previously stored in the devices.

For convenience of description, it will be described in FIG. 8 that RDEV1 represents a first device and RDEV2 represents a second device.

Referring to FIG. 8, in a $0^{th}$ block 800, the first device and the second device use a $0^{th}$ round 801 as a ranging round. In this case, the first device may perform ranging to the second device in the $0^{th}$ round 801. In this case, a present value of a hopping mode may be 0.

In this case, when the ranging between the first device and the second device is successful in the $0^{th}$ round 801, the first device and the second device may continue to use the same ranging round in a subsequent ranging block. For example, when a ranging round m is used in an $n^{th}$ ranging block, the ranging round m may also be used in an $(n+1)^{th}$ ranging block. Referring to FIG. 8, the first device and the second device may perform ranging using the $0^{th}$ round 811 even in a first block 810.

Referring to FIG. 8, because the first device and the second device have successfully performed ranging in the $0^{th}$ round 801, ranging is also performed by the first block 810 by using the $0^{th}$ round 811. In this case, the first device cannot perform ranging to the second device in the round 0 811. In this case, the value of the hopping mode may be changed to 1.

As the first device changes the value of the hopping mode to 1 and the changed value of the hopping mode is transmitted to the second device, the first device and the second device may perform hopping. For example, the first device may be a controller and the second device may be a controllee. Ranging round hopping may be performed when the first device and the second device perform ranging in a second block 820.

In the second block 820, the first device and the second device may perform ranging in a first round 822 instead of a $0^{th}$ round according to a result of hopping. For example, when the first device and the second device use the $m^{th}$ ranging round m in the $n^{th}$ ranging block, a $k^{th}$ ranging round may be used in the $(n+1)^{th}$ ranging block ($k \neq m$). When ranging is successful in the first round 822, the value of the hopping mode may be changed to 0. As the first device changes the value of the hopping mode to 0 and the changed value of the hopping mode is transmitted to the second device, the first device and the second device may perform ranging in a set ranging round. Therefore, referring to FIG. 8, even in a third block 830, ranging may be performed in a first round.

Figure 9A:
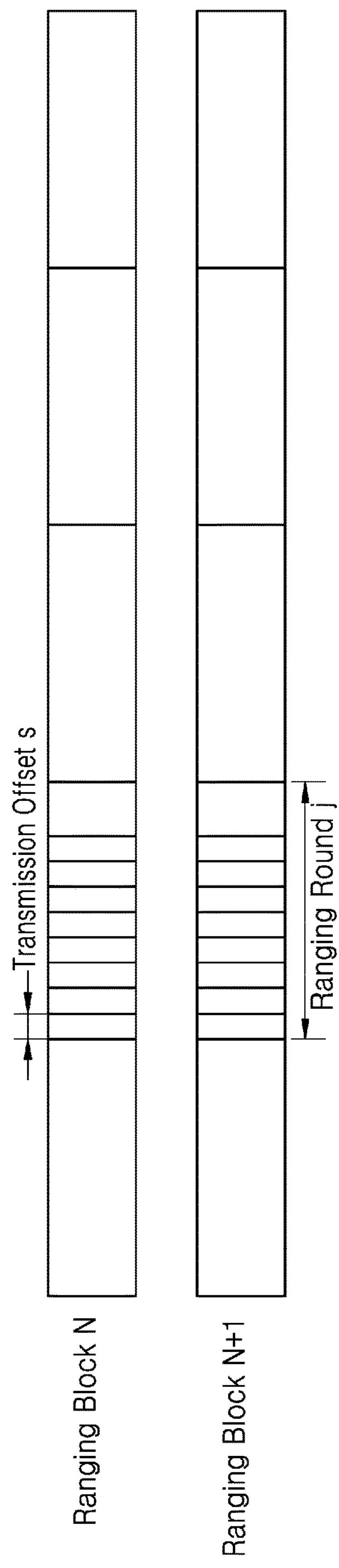
FIGS. 9A and 9B are diagrams illustrating a concept of a transmission offset and round hopping according to various embodiments of the disclosure.
Figure 9B:
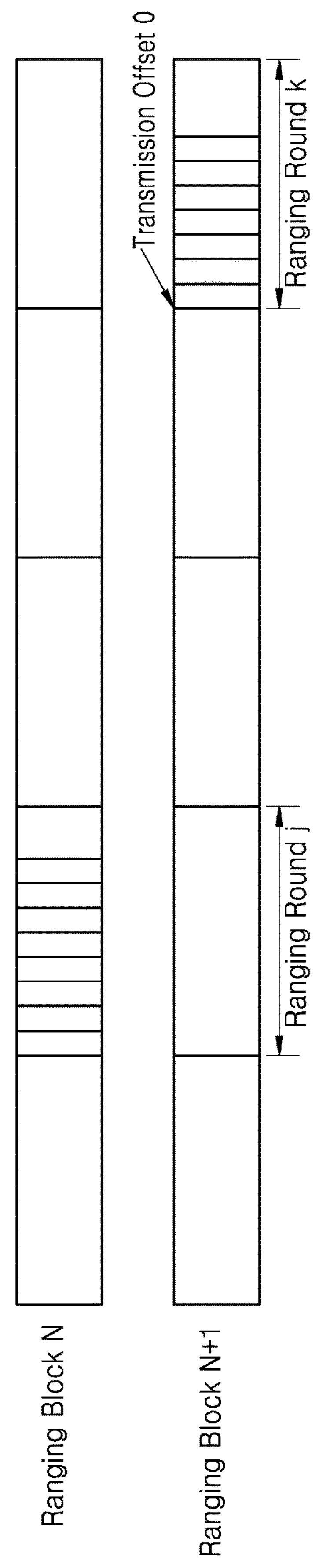

FIGS. 9A and 9B are diagrams illustrating a concept of a transmission offset and round hopping according to various embodiments of the disclosure.

Referring to FIG. 9A, the same ranging round j and the same transmission offset s are used in a ranging block N and a ranging block (N+1).

Referring to FIG. 9B, a ranging round j is used in a ranging block N but a ranging round k is used in a ranging block (N+1) by hopping. Separately from hopping, in FIG. 9B, a transmission offset s is used in the ranging block N but a transmission offset 0 is used in the ranging block (N+1).

In a ranging round allocated to a ranging block, a controller may configure the ranging round by transmitting a ranging control message (RCM) together with a ranging control IE and a ranging round IE. In this case, according to an embodiment of the disclosure, the ranging control IE may have the same structure as a ranging IE illustrated in FIG. 12. According to an embodiment of the disclosure, the ranging round IE may have a structure as illustrated in FIG. 13. A higher layer of the controller may select at least one of a hopping mode or a transmission offset to be used in a ranging round of a subsequent ranging block When the controller transmits to a controllee a final message scheduled in a current ranging round of a ranging block i, the controller may transmit a ranging round IE in the final message in the current ranging round to signal whether to hop from a ranging round of a ranging block (i+1), which is a subsequent ranging block, to another round. The ranging round IE may include a ranging block index field and a ranging round index field of the current ranging block and a hopping mode field and a transmission offset field for a ranging round of the subsequent ranging block. A more detailed description will be provided with reference to FIG. 13 below.

After the controllee receives the ranging round IE in the final message of a ranging message sequence, a higher layer of the controllee may use an indicated ranging round in the subsequent ranging block.

When, due to an interference event, the controllee did not receive the ranging round IE in the final message or the RCM, the controllee may turn on a hopping mode in the subsequent ranging block. In this case, the controllee may perform ranging using a new ranging round determined by a new hopping mode, a subsequent ranging block index, and a hopping sequence.

Figure 10:
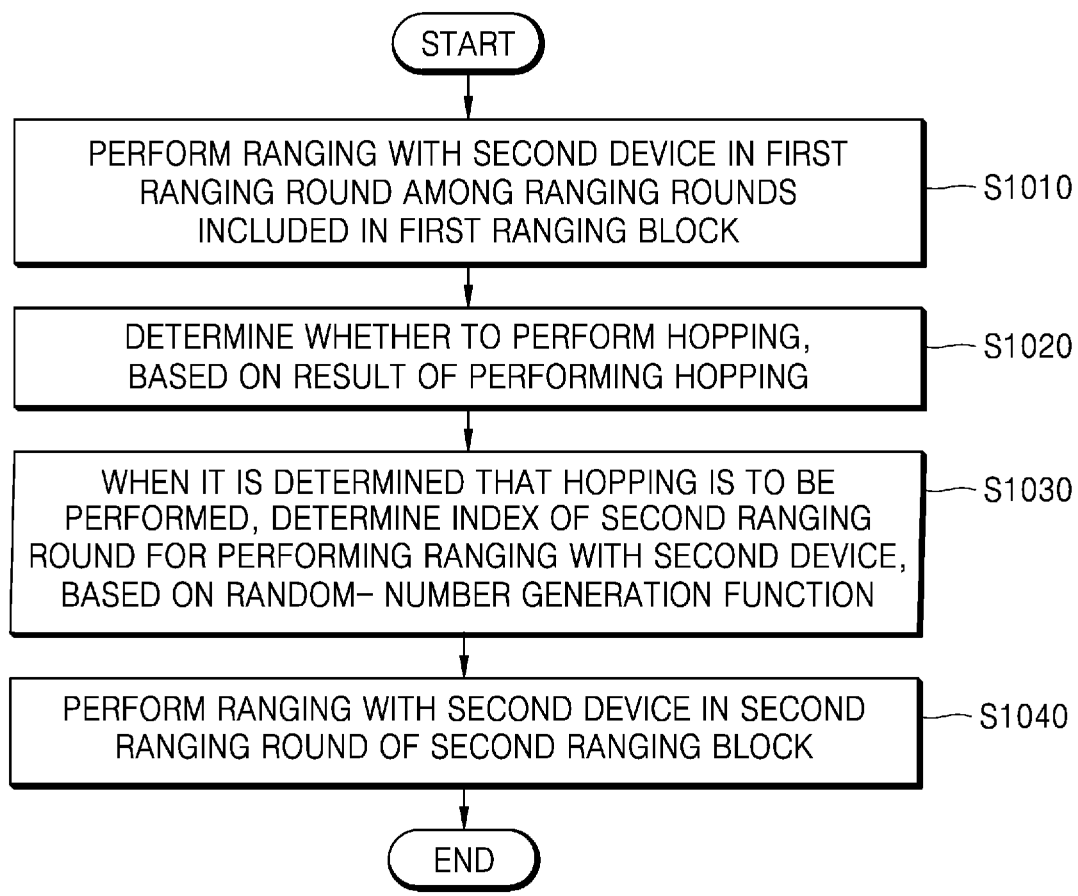
FIG. 10 is a flowchart of an operation method of a first device which performs ranging by using an ultra-wide band (UWB) according to an embodiment of the disclosure.

FIG. 10 is a flowchart of an operation method of a first device which performs ranging by using a UWB according to an embodiment of the disclosure.

Referring to FIG. 10, an operation method of each of the controller 100 and the controllee 200 according to an embodiment of the disclosure will be described below. When ranging is performed between two electronic devices, one of the two electronic devices may serve as a controller and the other may serve as a controllee. Thus, the controller may be referred to as a first device and the controllee may be referred to as a second device. Alternatively, one of the two electronic devices may serve as an initiator and the other may serve as a responder.

As used herein, a ranging session may refer to a group of devices involved in a continuous ranging procedure characterized by a certain initial parameter set. The ranging session should include one controller and one or more initiators. In this case, only the controller is capable of configuring initial ranging parameters. In addition, only the controller is capable of updating ranging parameters during a ranging session.

As used herein, a first ranging block may refer to a current ranging block in which a first device and a second device perform ranging or attempt ranging.

A second ranging block may refer to a ranging block after the first ranging block. For example, the first device and the second device may perform ranging in the first ranging block and thereafter perform ranging in the second ranging block. The second ranging block may be a ranging block immediately after the first ranging block. However, the second ranging block should be understood to means a ranging block arriving after the first ranging block and is not limited to the above-described example. As described above, the second ranging block may correspond to a ranging block index greater than that of the first ranging block.

As used herein, the first device and the second device may perform ranging in a first ranging round of the first ranging block. The first ranging round is a round in which ranging is currently performing and may refer to a ranging round that is set before hopping. In this case, according to an embodiment of the disclosure, the first ranging round may correspond to an $m^{th}$ ranging round included in the first ranging block. According to the above example, when it is assumed that an index of the first ranging round is 0, the first device and the second device may perform ranging in a ranging round corresponding to index (m−1) in the first ranging block.

In the present specification, when hopping is performed, the first device and the second device may perform ranging in a hopping round. A second ranging round may refer to a certain ranging round with respect to which hopping is performed and thus, it is determined that ranging is to be performed in the certain ranging block after the second ranging block. In an embodiment of the disclosure, the second ranging round may refer to a $k^{th}$ ranging round included in the second ranging block. According to the above example, when it is assumed that the index of the first ranging round is 0, the first device and the second device may perform ranging in a ranging round corresponding to index (k−1) in the second ranging block. In this case, m and k are merely values provided as examples of different values. In addition, the index corresponding to the first ranging round and the index corresponding to the second ranging round are different values.

According to an embodiment of the disclosure, the first device may perform ranging with the second device, based on the block-based mode.

Referring to FIG. 10, in operation S1010, the first device may perform ranging with the second device in the first ranging round among a plurality of ranging rounds included in the first ranging block. In an embodiment of the disclosure, the first device may perform ranging with the second device in an $m^{th}$ ranging round among the plurality of ranging rounds included in the first ranging block.

As used herein, "perform ranging" may be understood to mean only transmission of a ranging frame RFRAME. For example, "perform ranging" should be understood to include a case in which ranging failed because the first device did not receive a response from the second device. For example, "perform ranging" does not refer to deriving a ranging result value and should be understood to mean transmission of the ranging frame by a controller regardless of whether ranging fails or succeeds.

In operation S1020, the first device may determine whether to perform hopping, based on a result of performing ranging.

In an embodiment of the disclosure, the determining of whether to perform hopping, based on the result of performing ranging, may include determining that hopping is to be performed when the first device does not receive a response from the second device in the first ranging round. In addition, when the first device receives a response from the second device in the first ranging round, it may be determined that the first ranging round, which is a preset ranging round, is to be continuously used.

In another embodiment of the disclosure, the determining of whether to perform hopping, based on the result of performing ranging, may include determining, by the first device, that hopping is to be performed, based on an interference level for the first ranging round. For example, in order to determine whether it is appropriate to perform ranging for a current ranging round, the first device may identify whether an interference level for the current ranging round is less than or equal to a reference value.

For example, when the interference level is less than or equal to the reference value, the first device may determine to continue to use the first ranging round that is a preset ranging round. As another example, when the interference level is greater than the reference value, the first device may determine to perform hopping.

In another embodiment of the disclosure, the first device may determine to trigger a hopping function, based on the number of responses received from the second device.

In operation S1030, when the first device determines to perform hopping, an index of a second ranging round for performing ranging with the second device may be determined, based on a random number generation function. In an embodiment of the disclosure, when the first device determines to perform hopping, the index of a ranging round for performing ranging with the second device may be changed to (k−1), based on the random number generation function.

In an embodiment of the disclosure, the determining of the index of the second ranging round may include determining the index of the second ranging round, based on a result value of the random number generation function calculated based on an index corresponding to the second ranging block and a value of a hopping key of a ranging session.

In the present specification, the hopping key may be understood to mean a key used when a hopping sequence is performed. In this case, the hopping key may be generated differently for each session created between the first device and the second device. For example, a hopping key generated by the first device for a first session between the first device and the second device and a hopping key generated by the first device for a second session between the first device and the second device may be the same or may be different from each other. Alternatively, the hopping key may be generated differently for each pair of devices (hereinafter referred to as 'pair'). More specifically, when the first device and the second device are defined as a first pair and a third device and a fourth device are defined as a second pair, a hopping key used for the first pair and a hopping key used for the second pair may be the same or may be different from each other. In this case, each of the hopping keys may be generated from an initiator and transmitted to a responder. For explanation of the disclosure, the initiator will be referred to as the first device and the responder is described as the second device.

In an embodiment of the disclosure, the operation method may further include starting a ranging session between the first device and the second device and transmitting by the first device a hopping key for the ranging session.

More specifically, first, a ranging session between the first device and the second device may be started. Next, the second device may transmit a ranging session request (RS-RQ) message to the first device. The first device may transmit a ranging session response (RS-RS) message to the second device. When the exchange of the ranging session request message and the ranging session response message between the first device and the second device is successful, a ranging session may be established through a Bluetooth low energy (BLE) control channel.

Thereafter, the second device may transmit a ranging session setup request (RSS-RQ) message to the first device. After receiving the ranging session setup request message from the second device, the first device may determine a structure of a ranging block for the ranging session. More specifically, the first device may determine the number of rounds for a block to be used in the ranging session. In addition, the first device may also determine a preamble synchronization (SYNC) code index. Thereafter, the first device may transmit a ranging session setup response (RSS-RS) message to the second device.

In an embodiment of the disclosure, the hopping key for the ranging session may be transmitted in the ranging session setup response (RSS-RS) message transmitted by the first device to the second device.

In an embodiment of the disclosure, the random number generation function may include a hash function. When the hash function is used as the random number generation function, the index 'k' may be determined based on a result value of the hash function for the sum of an index corresponding to the second ranging block and a value of the hopping key for the ranging session. The following equation shows a method of determining the index of the second ranging round, which is a hopped round, by using the hash function.

$$S(i,\text{HoppingKey},N_{Round})=(((\text{HASH}(i+\text{HoppingKey})\ \&0\text{xFFFF})N_{Round})\gg 16)+1 \quad \text{Equation 4}$$

Here, S represents the index of the second ranging round which is a hopped round. i may represent the index of the second ranging block. For example, i may represent an index corresponding to a ranging block in which hopping is performed. HoppingKey may represent the hopping key described above. NRound may represent the number of ranging rounds included in the ranging block.

For example, the random number generation function may include at least one of Advanced Encryption Standard 128 (AES128), Secure Hash Algorithm 1 (SHA1), Message-Digest algorithm 5 (MD5), Cyclic redundancy check 32 (CRC32), Linear Congruential Generator (LCG), or Linear-feedback shift register. However, the random number generation function is not limited to the above-described functions and may include all functions capable of generating various random numbers by increasing entropy. The following equation shows a method of determining the index of the second ranging round, which is a hopped round, by using AES128.

$$S(i,\text{HoppingKey},N_{Round})=(((\text{AES}(i,\text{HoppingKey})\ \&0\text{xFFFF})N_{Round})\gg 16)+1 \quad \text{Equation 5}$$

The parameters of Equation 5 above may be defined to be the same as the parameters of Equation 4 described above. More specifically, S may represent the index of the second ranging round that is a hopped round. i may represent the index corresponding to the second ranging block. HoppingKey may represent the hopping key described above. NRound may represent the number of ranging rounds included in the ranging block.

The following equation shows a method of determining the index of the second ranging round, which is a hopped round, by using the SHA1 function.

$$S(i,\text{HoppingKey},N_{Round})=(((\text{SHA1}(i+\text{HoppingKey})\ \&0\text{xFFFF})N_{Round})\gg 16)+1 \quad \text{Equation 6}$$

The parameters of Equation 6 may be defined to be the same as the parameters of Equation 4 and Equation 5 described above.

In another embodiment of the disclosure, the determining of the index of the second ranging round may include determining the index of the second ranging round, based on at least one of scrambled timestamp sequence (STS) code of a certain slot (reference slot) of the first ranging block or the number of ranging rounds included in the ranging block.

More specifically, according to the present embodiment of the disclosure, an STS of a previous block generated through AES may be used to derive the index of the second ranging round. Because security for an index of a hopping round is not significant, previously generated STS code may be used.

Referring to the following equation, an index of a second ranging round for a second ranging block with an index i may be obtained, based on STS code for a certain slot for a first ranging block with an index (i−1).

$$S(i,N_{Round})=(((\text{ReferenceSlotSTS}(i-1)\&0xFFFF)\ N_{Round})\gg 16)+1 \quad \text{Equation 7}$$

Here, S represents the index of the second ranging round which is a hopped round. i may represent the index corresponding to the second ranging block. NRound may represent the number of ranging rounds included in the ranging block.

In an embodiment of the disclosure, when the second ranging block is an $i^{th}$ block, the index of the first ranging block including a certain slot (reference slot) may refer to an $(i-1)^{th}$ block. In this case, the first ranging block should be understood to mean a block for identifying the second ranging block and thus is not determined according to whether ranging succeeds or fails.

In an embodiment of the disclosure, the certain slot (reference slot) may be a first or last slot of a first block. However, the certain slot is not limited thereto and a slot in which previously generated STS code for the first block may be used as the certain slot.

In an embodiment of the disclosure, when the first device determines to perform hopping, information about a ranging round is transmitted to the second device so that the first device may instruct the second device to perform hopping in the second ranging block. For example, a ranging round IE and a ranging control IE may be transmitted in a ranging control message. Information about the ranging round will be described with reference to FIG. 13 below and the ranging control IE will be described with reference to FIG. 12 below.

In operation S1040, the first device may perform ranging with the second device in the second ranging round of the second ranging block. For example, the first device may perform ranging with the second device in a $k^{th}$ ranging round of the second ranging block.

FIG. 11 is a table illustrating subsequent ranging rounds derived based on a random-number generation function according to an embodiment of the disclosure.

More specifically, referring to FIG. 11, it illustrates result values obtained by calculating indexes of hopping rounds by using SHA1, which is an example of the random number generation function of the disclosure, in operation S1030. In this case, 0xABCD was used as a hopping key HOP_Key_RW and 10 was used as the number of ranging rounds NRound included in a ranging block but embodiments are not limited thereto. Referring to the table, when an index corresponding to a second ranging block is 1, it may be understood that a round with an index 6 is available as a ranging round in the second ranging block of the index 1.

Referring to FIG. 11, various indexes of hopping rounds are derived according to an index i corresponding to the second ranging block. Thus, a probability of a ranging failure when a ranging round with the same index as another pair is used may be lowered. A more detailed description will be provided with reference to FIGS. 15A to 17B below.

FIG. 12 is a diagram illustrating a configuration of information about ranging control according to an embodiment of the disclosure.

A controller may use a ranging control IE to transmit ranging configuration information to one controllee (in a unicast frame) or to multiple controllees (in a broadcast frame).

Referring to FIG. 12, the ranging control IE may include a multi-node mode field. A value of the multi-node mode field may indicate whether ranging is performed between a pair of single devices or within a multi-node range including a large number of devices.

As described above, in an embodiment of the disclosure, information about ranging control may include information about a configuration, such as a configuration of an advanced ranging control IE as illustrated in FIG. 12.

A ranging round usage field may specify a ranging technique and other usages used in a ranging round.

An STS packet configuration field may specify an STS packet format to be used in a ranging round subject to the ranging control IE of FIG. 12.

A schedule mode field may specify whether ranging is performed according to scheduling-based ranging or contention-based ranging.

A deferred mode field may specify whether a deferred frame is allowed for a measurement report.

A time structure indicator field may specify a ranging time structure operation in a subsequent ranging round.

In this case, according to an embodiment of the disclosure, the time structure indicator field may indicate whether ranging is an interval-based ranging or block-based ranging. More specifically, when a value of the time structure indicator field indicates a block-based time structure, a ranging round information IE and ranging block update IE may be used to control ranging interval updating. When the value of the time structure indicator field indicates an internal-based time structure, a ranging interval update IE may be used to control distance interval updating.

An RCM validity rounds field may specify the number of consecutive ranging rounds controlled by a ranging control message (RCM).

A multiple message receipt confirmation request (MMRCR) field may indicate whether a multiple message reception confirmation request is needed.

A content control field may indicate whether the ranging control IE further includes other fields.

A ranging block duration field may specify a ranging block duration on an RSTU basis.

A ranging round duration field may specify a ranging round period on a ranging slot basis. For example, the ranging round duration field may specify the number of ranging slots of a ranging round.

A ranging slot duration field may specify a ranging slot duration for each RSTU.

A session identification (ID) field may include a unique session identifier for a session of each controller.

When a ranging block structure is subject to the same specified duration as before, one or more interval fields may not be included in the ranging round IE. More specifically, when the specified duration remains the same as previously set information, a ranging round IE of a current RCM may not include the ranging block duration field, the ranging round duration field, and the ranging slot duration field.

However, a configuration of a ranging control IE employed in the disclosure is not limited to that of FIG. 12 described above.

FIG. 13 is a diagram illustrating a configuration of information about a ranging round according to an embodiment of the disclosure.

Referring to FIG. 13, the information about the ranging round may be used for a first device to signal ranging round information for a current ranging round or ranging round information for a subsequent ranging round to a second device, as described above with respect to operation S1030.

The information about the ranging round may include information described below.

The information about the ranging round may include information about a current ranging round (i.e., a ranging round of a ranging block i). In this case, the information about the ranging round may be included in a ranging control message of the ranging block i. The information about the ranging round, which is transmitted in the ranging control message of the current ranging round, may be used by a device to synchronize with a block structure. In the present specification, the current ranging round refers to a first ranging round.

The information about the ranging round may include information about a subsequent ranging round (i.e., a ranging round of a subsequent ranging block (i+1)). For example, when a lastly scheduled message in the current ranging round is a message transmitted by a controller to a controllee, the information about the ranging round may be transmitted in this message to signal information about the ranging round of the subsequent ranging block (i+1).

In an embodiment of the disclosure, a ranging round IE may include a ranging block index field. The ranging block index field may indicate an index of a second ranging block.

In an embodiment of the disclosure, the ranging round IE may include a hopping mode field. The hopping mode field may indicate a hopping mode of a ranging block. More specifically, the hopping mode field may indicate a hopping mode of the second ranging block. For example, when a value of the hopping mode is 0, it may indicate that hopping is not to be performed, and when the value of the hopping mode is 1, it may indicate that hopping is to be performed.

In an embodiment of the disclosure, the ranging round IE may include a round index field. The round index field may indicate a ranging round index of the ranging block.

In an embodiment of the disclosure, the ranging round IE may include a transmission offset field. The transmission offset field may specify a transmission offset value of a ranging round in a block on an RSTU basis. The transmission offset is a result of subtracting a packet duration from a maximum ranging slot interval.

When a second device receives information about a ranging round from a first device, hopping may be performed, based on the information about the ranging round. In this case, the first device and the second device may previously set a hopping sequence to be used. In the disclosure, the operation method of FIG. 10 corresponds to a hopping sequence and thus it may be understood that the first device and the second device have previously set a method of determining an index of a hopping round as described above. In addition, the first device and the second device may exchange all information necessary to generate the hopping sequence.

However, a configuration of information about a ranging round employed in the disclosure is not limited to that of FIG. 13 described above. Information instructing, by the first device, the second device to perform hopping may be used as information about a ranging round.

Figure 14:
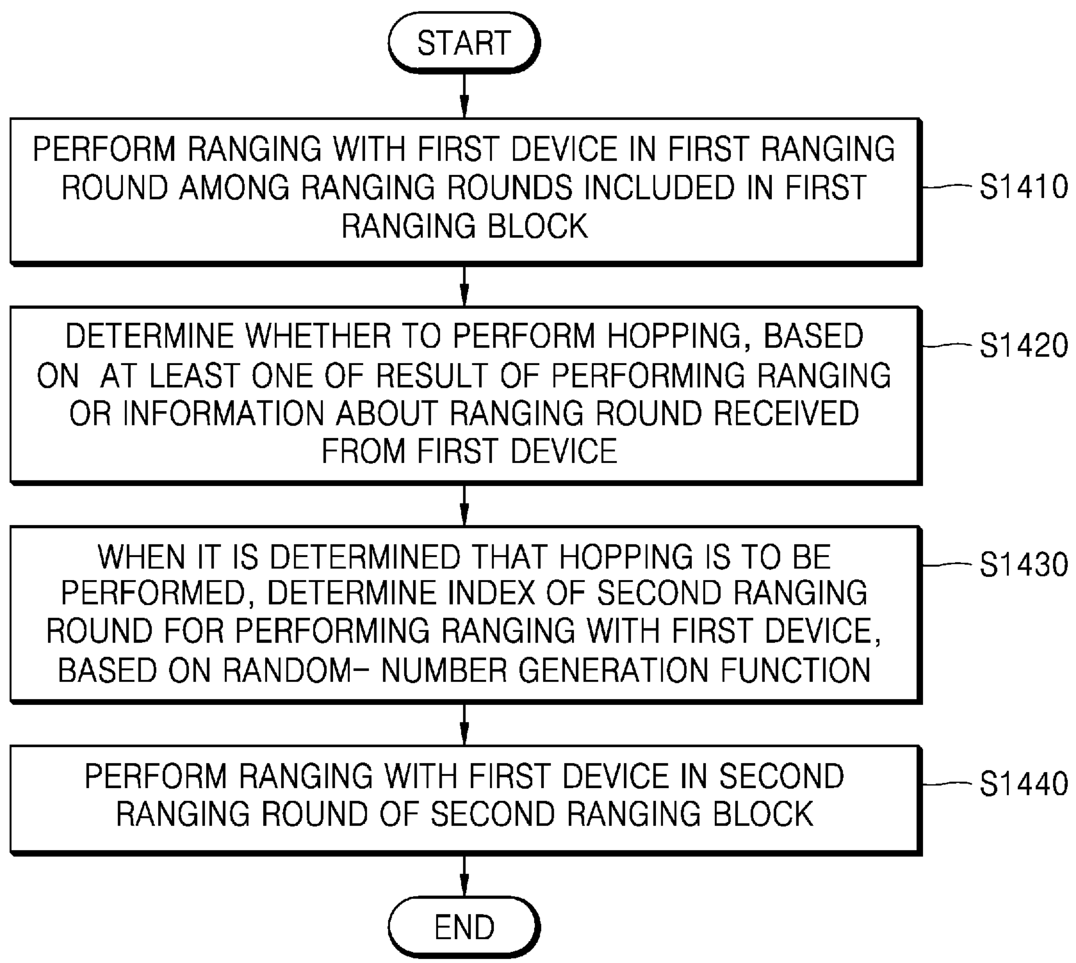
FIG. 14 is a flowchart of an operation method of a second device which performs ranging by using a UWB according to an embodiment of the disclosure.

FIG. 14 is a flowchart of an operation method of a second device which performs ranging by using a UWB according to an embodiment of the disclosure. A description of parts of the operation method of FIG. 14 that are the same as those of FIG. 14 is omitted here.

Referring to FIG. 14, in operation S1410, the second device may perform ranging with a first device in a first ranging round among a plurality of ranging rounds included in a first ranging block.

In operation S1420, the second device may determine whether to perform hopping, based on at least one of a result of performing ranging or information about a ranging round received from the first device.

The information about the ranging round may include at least one of index information of a second ranging block, index information about the second ranging round, or hopping mode information. The information about the ranging round is as described above with reference to FIG. 13 and thus is not redundantly described here.

For example, the determining by the second device of whether to perform hopping may include identifying the hopping mode information included in the information about the ranging round. The determining, by the second device, of whether to perform hopping may further include determining whether to perform hopping, based on the hopping mode information.

In another embodiment of the disclosure, the determining, by the second device, of whether to perform hopping may include determining that hopping is to be performed when the second device does not receive a response from the first device in the first ranging round. In this case, for example, the message that the second device does not receive from the first device may be a ranging control message. Alternatively, the message that the second device does not receive from the first device may include information about a ranging round.

As another example, the message that the second device does not receive from the first device may be a response message, from the first device, to a message transmitted from the second device.

In operation S1430, when it is determined that hopping is to be performed, the second device may determine an index of a second ranging round for performing ranging with the first device, based on the random number generation function.

In an embodiment of the disclosure, the determining by the second device of the index of the second ranging round may include determining the index of the second ranging round, based on a result value of the random-number generation function calculated based on the index of the second ranging block and a value of a hopping key of a ranging session.

In this case, the determining by the second device of the index of the second ranging round may further includes starting a ranging session between the first device and the second device and receiving by the second device a hopping key for the ranging session from the first device.

In an embodiment of the disclosure, the random-number generation function may include the hash function. The second device may determine the index of the second ranging round based on a result value of the hash function for the sum of the index of the second ranging block and the value of the hopping key for the ranging session.

In another embodiment of the disclosure, the determining by the second device of the index of the second ranging round may include determining the index of the second ranging round, based on at least one of STS code for a certain slot of the first ranging block or the number of ranging rounds included in the ranging block.

A detailed description is as described above in operation S1030 of FIG. 10 and thus is omitted here.

In operation S1440, the second device may perform ranging with the first device in the second ranging round of the second ranging block.

FIGS. 15A to 17B are diagrams illustrating a ranging success rate when ranging is performed according to an index of a determined hopping range round according to various embodiments of the disclosure.

For convenience of description, a ranging session is established by the first device and the second device and thus the first and second devices may be defined as a first pair. In addition, a ranging session is established by a third device and a fourth device and thus the third and fourth devices may be defined as a second pair.

For convenience of description, a second ranging round, which refers to a ranging round used when it is determined that hopping is to be performed, will be defined and described below as a hopping round.

Figure 15A:
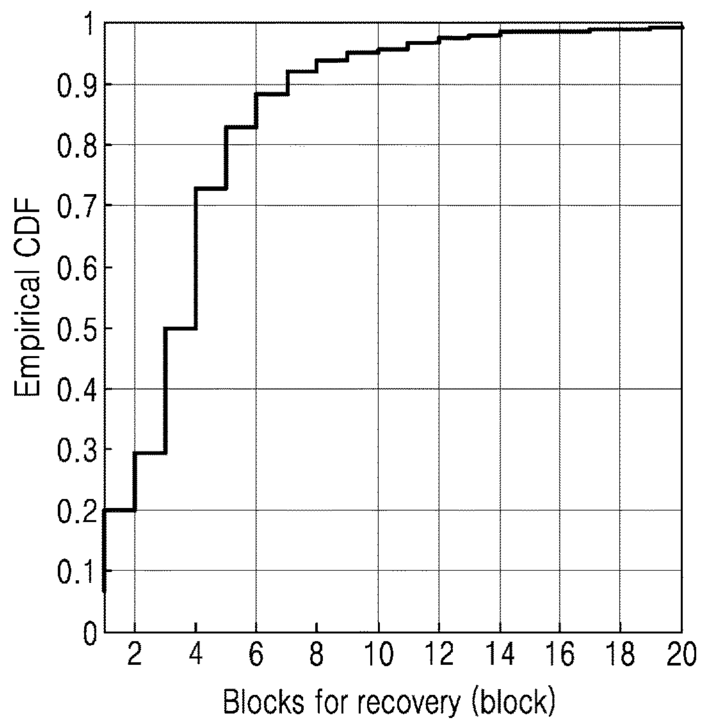
FIGS. 15A and 15B are diagrams illustrating a ranging success rate when ranging is performed according to an index of a determined hopping range round according to various embodiments of the disclosure.
Figure 15B:
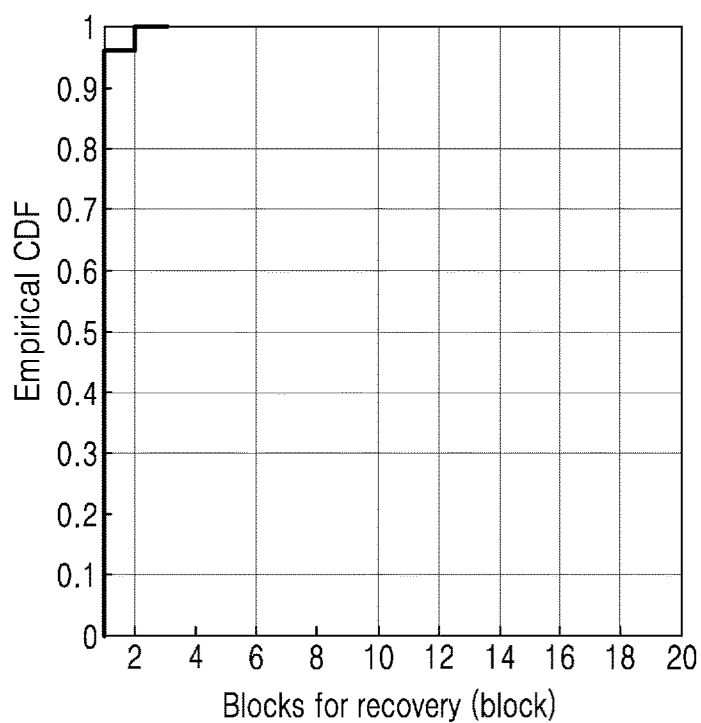

FIGS. 15A and 15B are diagrams illustrating a ranging success rate for each ranging block when it is assumed that a hopping key with a fixed value of 1 is allocated to a first pair and a second pair according to various embodiments of the disclosure.

In order to obtain a success rate, 1000 iterations were performed. In this case, a ranging start time of each of the first pair and the second pair or a round at which ranging is started was randomly set at each iteration. FIG. 15A illustrates a ranging success rate when an index of a hopping round obtained according to the related art was used. FIG. 15A illustrates a ranging success rate when an index of a hopping round obtained according to an embodiment of the disclosure was used.

Referring to FIG. 15A, when an index of a hopping round was obtained according to the related art, a success rate was 20% with respect to a block with an index of 2 and was 50% with respect to a block with an index of 4. This means that ranging rounds of the first pair and the second pair may be set to overlap for several blocks and thus a probability that each of the first pair and the second pair will be successful in terms of ranging is low. For example, it means that hopping rounds obtained by performing hopping by the first pair and ranging rounds used by the second pair may consecutively overlap. As a value of a block increases, a success rate increases. This may be understood to mean that a probability that indexes of hopping rounds used by the first pair and the second pair will continuously overlap decreases and decreases as an index of a block increases.

Referring to FIG. 15B, when an index of a hopping round was obtained according to an embodiment of the disclosure, a success rate was about 96% with respect to a block with an index of 1 and was 100% with respect to a block with an index of 2. Referring to FIG. 11, this is an effect occurring because, when indexes of hopping round are obtained according to an embodiment of the disclosure, various indexes of the hopping round may be derived for blocks. For example, various indexes of a hopping round may be generated for blocks by the first pair. Similarly, various indexes of a hopping round may be generated for blocks by the second pair and thus a probability that indexes of the hopping round generated by the first pair and indexes of the hopping round generated by the second pair will overlap is extremely low, thereby achieving a ranging success rate within a short time.

Figure 16A:
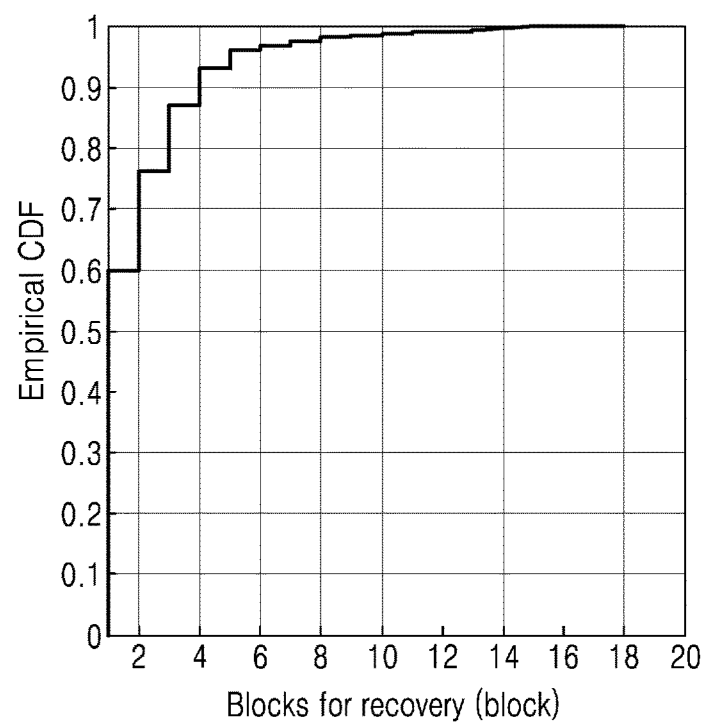
FIGS. 16A and 16B are diagrams illustrating a ranging success rate when ranging is performed according to an index of a determined hopping range round according to various embodiments of the disclosure.
Figure 16B:
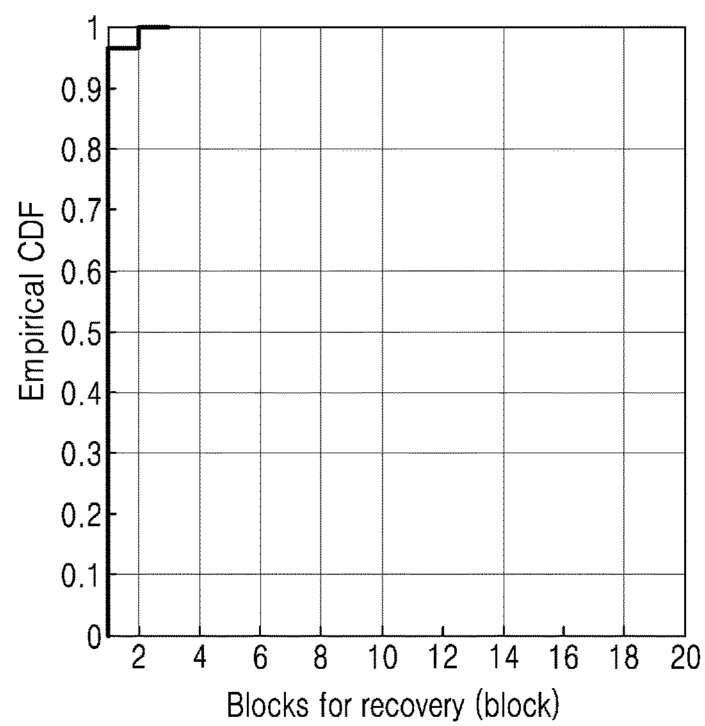

FIGS. 16A and 16B show results similar to those of FIGS. 15A and 15B described above.

FIGS. 16A and 16B are diagrams illustrating a ranging success rate for each ranging block when it is assumed that the same hopping key is allocated to a first pair and a second pair according to various embodiments of the disclosure.

To obtain a success rate, 100 hopping keys were used. In addition, 10 iterations were performed for each given key. In this case, a ranging start time of each of the first pair and the second pair or a round at which ranging is started was randomly set at each iteration. FIG. 16A illustrates a ranging success rate when an index of a hopping round obtained according to the related art was used. FIG. 16B illustrates a ranging success rate when an index of a hopping round obtained according to an embodiment of the disclosure was used.

Referring to FIG. 16A, when an index of a hopping round was obtained according to the related art, a success rate was 60% with respect to a block with an index of 2 and was about 88% with respect to a block with an index of 4.

Referring to FIG. 16B, when an index of a hopping round was obtained according to an embodiment of the disclosure, a success rate was about 98% with respect to a block with an index of 1 and was 100% with respect to a block with an index of 2.

Figure 17A:
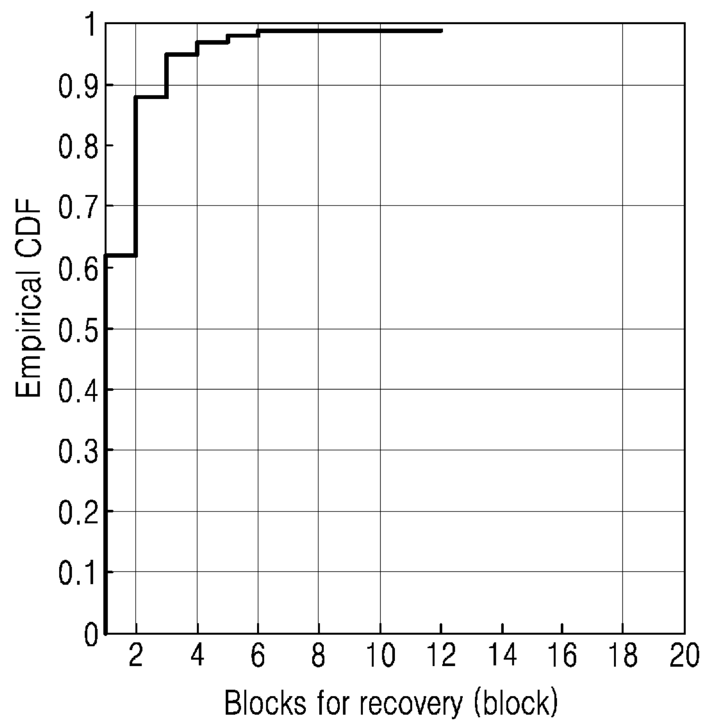
FIGS. 17A and 17B are diagrams illustrating a ranging success rate when ranging is performed according to an index of a determined hopping range round according to various embodiments of the disclosure.
Figure 17B:
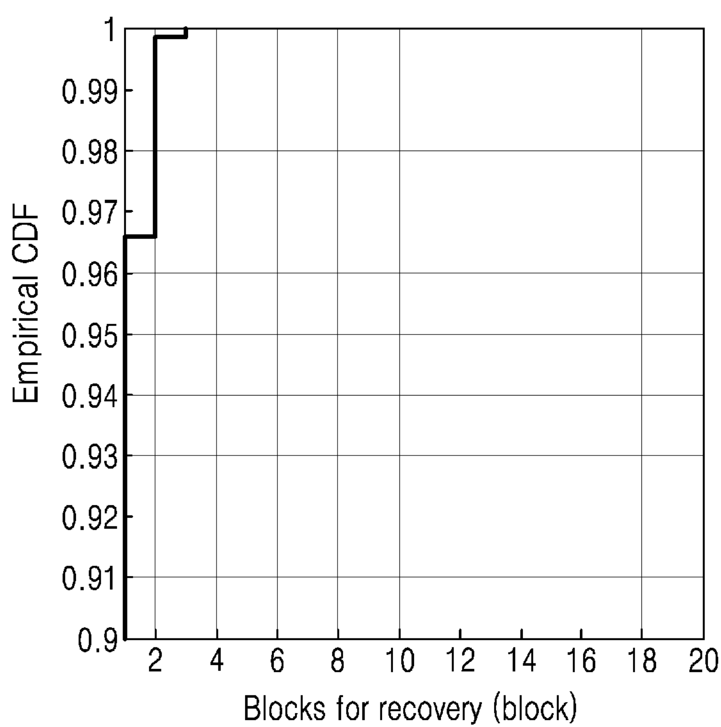

FIGS. 17A and 17B show results similar to those of FIGS. 15A, 15B, 16A and 16B described above.

FIGS. 17A and 17B are a diagram illustrating a ranging success rate for each ranging block when it is assumed that different hopping keys are allocated to a first pair and a second pair according to various embodiments of the disclosure. To obtain a success rate, 100 random hopping keys were used. In addition, 10 iterations were performed for each given key. In this case, a ranging start time of each of the first pair and the second pair or a round at which ranging is started was randomly set at each iteration. FIG. 17A illustrates a ranging success rate when an index of a hopping round obtained according to the related art was used. FIG. 17B illustrates a ranging success rate when an index of a hopping round obtained according to an embodiment of the disclosure was used.

Referring to FIG. 17A, when an index of a hopping round was obtained according to the related art, a success rate was 96% with respect to a block with an index of 1 and was 100% with respect to a block with an index of 1.

Referring to FIG. 17B, when an index of a hopping round was obtained according to an embodiment of the disclosure, a success rate was about 97% with respect to a block with an index of 1 and was 100% with respect to a block with an index of 3.

When taken into consideration of FIGS. 11 and 15A to 17B, a probability of ranging failure caused when the same ranging round is used by each pair may be greatly reduced by using a hopping sequence for obtaining an index of a hopping ranging round according to an embodiment of the disclosure. This is because various indexes of a hopping ranging round may be obtained by increasing entropy as illustrated in FIG. 11. Accordingly, according to an embodiment of the disclosure, a probability that a pattern of an index of a hopping ranging round will be repeated generated for each block is extremely low. Furthermore, according to an embodiment of the disclosure, indexes of hopping ranging rounds generated by pairs do not continuously overlap for several ranging blocks. Therefore, it is possible to increase a probability that each pair will succeed in ranging.

Figure 18:
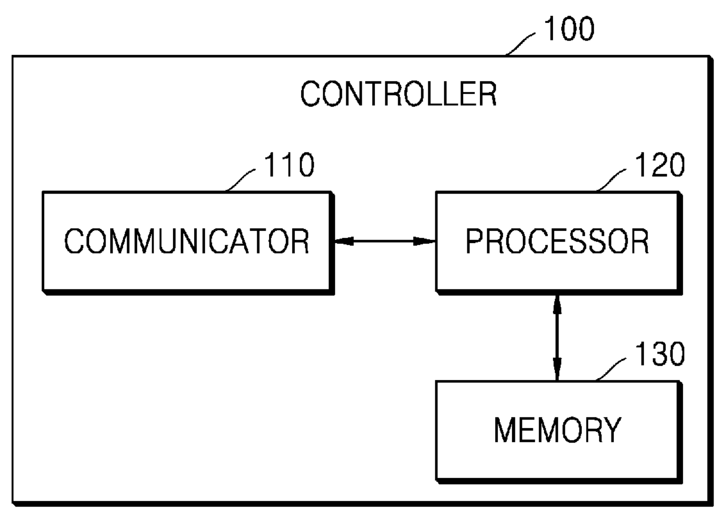
FIG. 18 is a block diagram of a controller according to an embodiment of the disclosure.

FIG. 18 is a block diagram of a controller 100 according to an embodiment of the disclosure.

In an embodiment of the disclosure, the controller 100 may be a fixed user terminal (UE) or a mobile UE. Examples of the controller 100 may include, but are not limited to, at least one of a smart phone, a cellular phone, a navigation device, a computer, a laptop computer, a digital broadcasting terminal, an artificial intelligence speaker, a speaker, a personal digital assistant (PDA), a portable multimedia player (PMP), or a tablet PC. The controller 100 may communicate with other devices and/or servers via a network by using a wireless or wired communication method.

Figure 20:
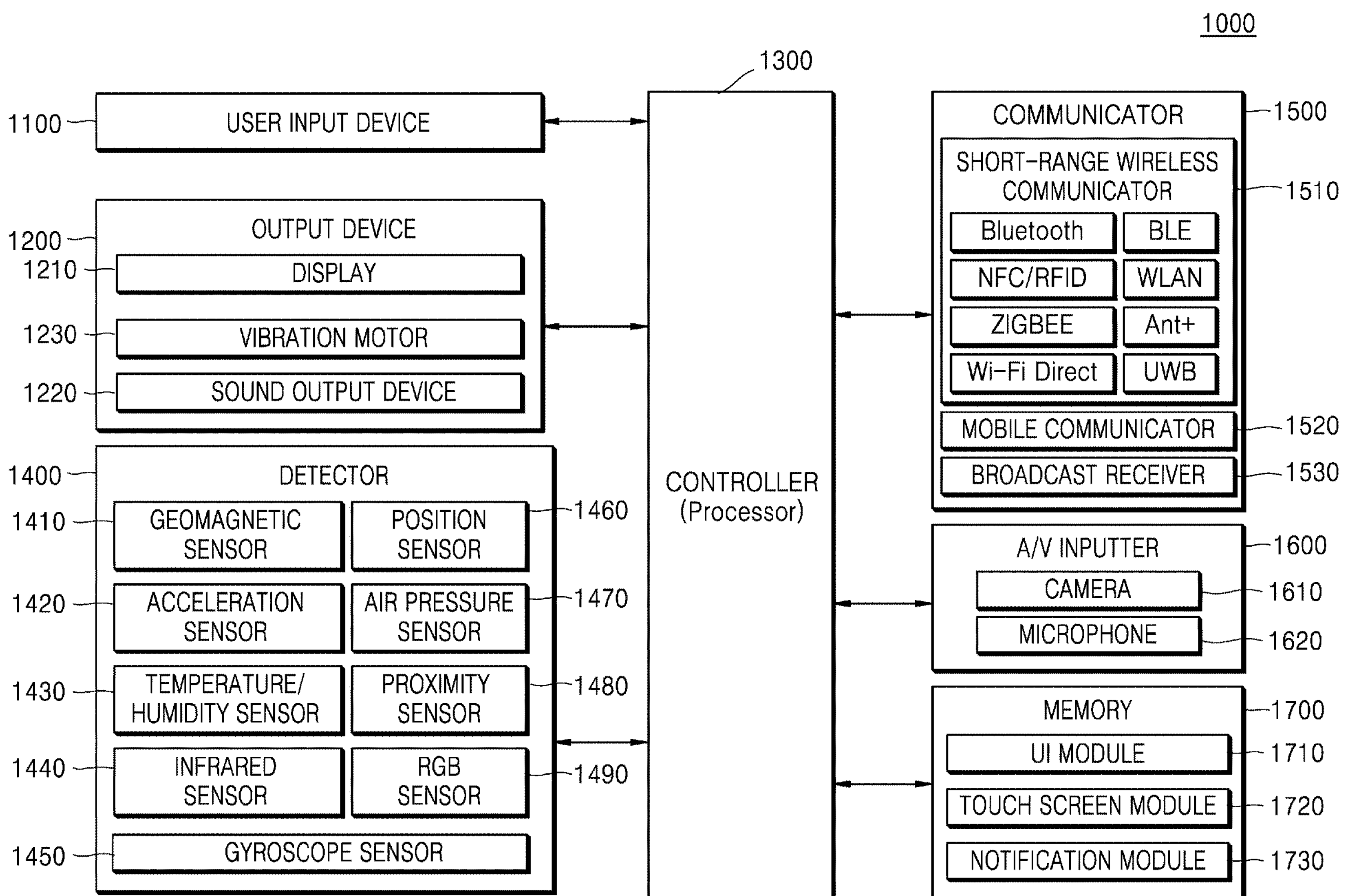
FIG. 20 is a block diagram of an electronic device according to an embodiment of the disclosure.

Referring to FIG. 18, the controller 100 according to an embodiment of the disclosure may include a communicator 110, a processor 120, and a memory 130. However, the controller 100 may be embodied as including more components than all the components illustrated in FIG. 18. For example, as illustrated in FIG. 20, the controller 100 according to an embodiment of the disclosure may include at least one of a user input device 1100, an output device 1200, a detector 1400 or an audio/video (A/V) input device 1600.

Although the controller 100 is illustrated as including one processor in FIG. 18, embodiments of the disclosure are not limited thereto and the controller 100 may include a plurality of processors. At least some of operations and functions of the processor 120 described below may be performed by a plurality of processors. The controller 100 illustrated in FIG. 18 may perform operation methods of the controller 100 according to various embodiments of the disclosure, and the descriptions of FIGS. 3 to 17B may apply thereto. Therefore, a description of the controller 100 that is the same as those of FIGS. 3 and 17B described above is omitted here.

The communicator 110 according to an embodiment of the disclosure may establish wired or wireless communication with other devices via a network. To this end, the communicator 110 may include a communication module supporting at least one of various wired and wireless communication methods. For example, the communication module may be in the form of a chipset or may be a sticker/barcode (e.g., a sticker with a near-field communication (NFC) tag) storing information necessary for communication.

The wireless communication may include, for example, at least one of cellular communication, wireless fidelity (Wi-Fi), Wi-Fi Direct, Bluetooth, UWB, or near-field communication (NFC). The wired communication may include, for example, at least one of USB or high-definition multimedia interface (HDMI).

In an embodiment of the disclosure, the communicator 110 may include a communication module for short range communication. For example, the communicator 110 may include a communication module for establishing various short-range communications, such as infrared communication and magnetic secure transmission (MST) communication, as well as UWB, Wi-Fi, Wi-Fi Direct, Bluetooth, and NFC described above.

The processor 120 according to an embodiment of the disclosure controls overall operations of the controller 100 and may include at least one processor, such as a central processing unit (CPU) or a graphical processing unit (GPU). The processor 120 may control other components included in the controller 100 to perform UWB ranging. The memory 130 may store a program for processing and controlling performed by the processor 120, and store data input to or output from the controller 100.

In an embodiment of the disclosure, the processor 120 may perform ranging with a second device in a first ranging round among a plurality of ranging rounds included in a first ranging block.

In an embodiment of the disclosure, the processor 120 may determine whether to perform hopping, based on a result of performing ranging. For example, the processor 120 may determine to perform hopping when a first device did not receive a response from the second device in the first ranging round. As another example, the processor 120 may determine to perform hopping based on an interference level for the first ranging round.

In an embodiment of the disclosure, when it is determined that hopping is to be performed, the processor 120 may determine an index of a second ranging round for performing ranging with the second device, based on the random-number generation function. For example, the processor 120 may determine the index of the second ranging round by considering a result value of the random-number generation function calculated based on an index of a second ranging block and a hopping key value for a ranging session. The random-number generation function may include the hash function, and the processor 120 may determine the index of the second ranging round based on a result value of the hash function for the sum of the index of the second ranging block and the hopping key value for the ranging session. In addition, the processor 120 may start a ranging session between the first device and the second device and transmit a hopping key for the ranging session.

In an embodiment of the disclosure, the processor 120 may determine the index of the second ranging round, based on at least one of STS code for a certain slot of the first ranging block or the number of ranging rounds included in a ranging block.

In an embodiment of the disclosure, when it is determined that hopping is to be performed, the processor 120 may transmit information about a ranging round to the second device to instruct to perform hopping in the second ranging block.

In an embodiment of the disclosure, the processor 120 may perform ranging with the second device in a second ranging round of the second ranging block. In this case, an index of the first ranging round and an index of the second ranging round may be different values.

The above description with respect to FIGS. 3 to 17B may apply to a method for a hopping sequence, the method being performed by the processor 120 and thus is omitted herein.

Figure 19:
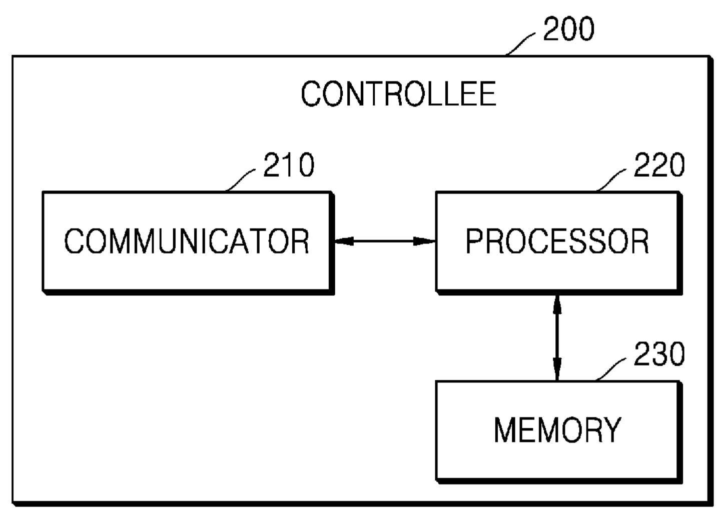
FIG. 19 is a block diagram of a controllee according to an embodiment of the disclosure.

FIG. 19 is a block diagram of a controllee 200 according to an embodiment of the disclosure.

In an embodiment of the disclosure, the controllee 200 may be a fixed UE or a mobile UE. Examples of the controllee 200 may include, but are not limited to, at least one of a smart phone, a cellular phone, a navigation device, a computer, a laptop computer, a digital broadcasting terminal, an artificial intelligence speaker, a speaker, a personal digital assistant (PDA), a portable multimedia player (PMP), or a tablet PC. The controllee 200 may communicate with other devices and/or servers via a network by using a wireless or wired communication method.

Referring to FIG. 19, the controllee 100 according to an embodiment of the disclosure may include a communicator 210, a processor 220, and a memory 230. However, the controllee 200 may be embodied as including more components than all the components illustrated in FIG. 19. For example, as illustrated in FIG. 20, according to some embodiments of the disclosure, the controllee 200 may include at least one of a user input device 1100, an output device 1200, a detector 1400, or an audio/video (A/V) input device 1600.

Although the controllee 200 is illustrated as including one processor in FIG. 19, embodiments of the disclosure are not limited thereto and the controllee 200 may include a plurality of processors. At least some of operations and functions of the processor 220 described below may be performed by a plurality of processors. The controllee 200 illustrated in FIG. 19 may perform operation methods according to various embodiments of the disclosure and the descriptions of FIGS. 3 to 17B may apply thereto. Therefore, a description of the controllee 200 that is the same as those of FIGS. 3 and 17B described above is omitted here.

The communicator 210 according to an embodiment of the disclosure may establish wired or wireless communication with other devices via a network. To this end, the communicator 210 may include a communication module supporting at least one of various wired and wireless communication methods. For example, the communication module may be in the form of a chipset or may be a sticker/barcode (e.g., a sticker with an NFC tag) storing information necessary for communication.

The wireless communication may include, for example, at least one of cellular communication, Wi-Fi, Wi-Fi Direct, Bluetooth, UWB, or NFC. The wired communication may include, for example, at least one of USB or high-definition multimedia interface (HDMI).

In an embodiment of the disclosure, the communicator 210 may include a communication module for short range communication. For example, the communicator 210 may include a communication module for establishing various short-range communications, such as infrared communication and magnetic secure transmission (MST) communication, as well as UWB, Wi-Fi, Wi-Fi Direct, Bluetooth, and NFC described above.

The processor 120 according to an embodiment of the disclosure controls overall operations of the controllee 200 and may include at least one processor, such as a CPU or a GPU. The processor 220 may control other components included in the controllee 200 to perform UWB ranging. The memory 230 may store a program for processing and controlling performed by the processor 220, and store data input to or output from the controllee 200.

In an embodiment of the disclosure, the processor 220 may perform ranging with a first device in a first ranging round among a plurality of ranging rounds included in a first ranging block.

In an embodiment of the disclosure, the processor 120 may determine whether to perform hopping, based on at least one of a result of performing ranging or information about a ranging round received from the first device.

In an embodiment of the disclosure, the information about the ranging round may include at least one of index information of the second ranging block, index information about the second ranging round, or hopping mode information. The processor 220 may identify the hopping mode information included in the information about the ranging round, and determine whether to perform hopping, based on the hopping mode information.

As another example, the processor 220 may determine to perform hopping when a second device did not receive a response from the first device in the first ranging round.

In an embodiment of the disclosure, when it is determined that hopping is to be performed, the processor 220 may determine an index of a second ranging round for performing ranging with the first device, based on the random-number generation function.

For example, the processor 220 may determine the index of the second ranging round by considering a result value of the random-number generation function calculated based on an index of a second ranging block and a value of a hopping key for a ranging session.

The processor 220 may start a ranging session between the first device and the second device, and the second device may receive the hopping key for the ranging session from the first device.

In an embodiment of the disclosure, the processor 120 may perform ranging with the first device in a second ranging round of the second ranging block. An index of the first ranging round and an index of the second ranging round may be different values.

The above description with reference to FIGS. 3 to 17B may apply to a detailed method for a hopping sequence, the method being performed by the processor 220, and thus is omitted here.

FIG. 20 is a block diagram of an electronic device according to an embodiment of the disclosure.

Referring to FIG. 20, a device 1000 may include the same components as the controller 100 of FIG. 18 and the controlee 200 of FIG. 19. For example, a controller 1300 among components illustrated in FIG. 20 may be the same as the processor 120 illustrated in FIG. 18 or the processor 220 illustrated in FIG. 19. A communicator 1500 among the components illustrated in FIG. 20 may be the same as the communicator 110 illustrated in FIG. 18 or the communicator 210 illustrated in FIG. 19. A memory 1700 among the components illustrated in FIG. 20 may be the same as the memory 130 illustrated in FIG. 18 or the memory 230 illustrated in FIG. 19.

The device 1000 of FIG. 20 may perform all the operations and functions of the controller 100 or the controllee 200 described above. Therefore, components of the device 1000 that are not described above will be described below.

Referring to FIG. 20, the device 1000 may include the user input device 1100, the output device 1200, the controller 1300, the detector 1400, the communicator 1500, the A/V input device 1600, and the memory 1700.

The user input device 1100 refers to a means for inputting data by a user to control the device 1000. Examples of the user input device 1100 may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezo effect-type touch pad, or the like), a jog wheel, a jog switch, or the like. The user input device 1100 may receive a user input necessary for generating conversation information to be provided to a user.

The output device 1200 may output an audio signal, a video signal, or a vibration signal, and include a display 1210, a sound output device 1220, and a vibration motor 1230. The output device 1200 according to an embodiment of the disclosure may notify a user that the device 1000 is in a high attenuation situation. For example, the output device 1200 may induce the device 1000 to be taken out of the user's pocket for accurate ranging.

The vibration motor 1230 may output a vibration signal. For example, the vibration motor 1230 may output a vibration signal corresponding to an output of audio data or video data (e.g., call signal reception sound, message reception sound, or the like).

The detector 1400 may detect a state of the device 1000 or surrounding conditions of the device 1000 and transmit detected information to the controller 1300.

The detector 1400 may include, but is not limited to, at least one of a geomagnetic sensor 1410, an acceleration sensor 1420, a temperature/humidity sensor 1430, an infrared sensor 1440, a gyroscope sensor 1450, a position sensor (e.g., a geographic positioning system (GPS)) 1460, an air pressure sensor 1470, a proximity sensor 1480, or a red green blue (RGB) sensor (illuminance sensor) 1490.

The detector 1400 according to an embodiment of the disclosure may detect a movement of the device 1000. The controller 1300 may reduce a transmission interval of an initial connection message when a movement of the device 1000 is sensed, and increase the transmission interval of the initial connection message when a movement of the device 1000 is not detected for a certain time. Functions of these sensors are intuitively reasonable by those of ordinary skill in the art from the names thereof and thus a detailed description thereof is omitted here.

The communicator 1500 may include a component for communication with other devices. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth low energy (BLE) communicator, a near-field communicator, a WLAN (Wi-Fi) communicator, a ZigBee communicator, an infrared data association (IrDA) communicator, a WFD (Wi-Fi Direct) communicator, an ultra-wideband (UWB) communicator, an Ant+ communicator, and the like.

The mobile communicator 1520 transmits a radio signal to or receives a radio signal from at least one of a base station, an external UE, or a server via a mobile communication network. Here, the radio signal may include a voice call signal, a video call signal, or various types of data according to transmission or reception a text/multimedia message.

The broadcast receiver 1530 receives a broadcast signal and/or broadcast-related information from the outside through a broadcast channel. The broadcast channel may include a satellite channel and a terrestrial channel According to an embodiment of the disclosure, the device 1000 may not include the broadcast receiver 1530.

The AN input device 1600 is configured to input an audio signal or a video signal, and may include a camera 1610 and a microphone 1620. The camera 1610 may obtain a video frame, such as a still image or a moving picture, through an image sensor in a video call mode or a shooting mode. An image captured by the image sensor may be processed by the controller 1300 or a separate image processor (not shown).

An image frame processed by the camera 1610 may be stored in the memory 1700 or transmitted to the outside through the communicator 1500. Two or more cameras 1610 may be provided according to an embodiment of a UE.

The microphone 1620 receives an external sound signal and converts the external sound signal into electrical voice data. For example, the microphone 1620 may receive a sound signal from an external device or a speaker. The microphone 1620 may use various noise removing algorithms to remove noise generated during receiving an external sound signal.

The memory 1700 may store a program for processing and controlling the controller 1300, and store data input to or output from the device 1000.

The memory 1700 may include at least one type of storage medium among a flash memory type storage medium, a hard disk type storage medium, a multimedia card micro type storage medium, a card type memory (e.g., SD or XD memory), RAM, SRAM, ROM, EEPROM, PROM, magnetic memory, a magnetic disk, and an optical disk.

Programs stored in the memory 1700 may be classified into a plurality of modules, e.g., a user interface (UI) module 1710, a touch screen module 1720, a notification module 1730, and the like, according to functions thereof.

The UI module 1710 may provide a specialized UI, a graphical user interface (GUI), or the like, which is linked to the device 1000 for each application. The touch screen module 1720 may detect a user's touch gesture on a touch screen and transmit information about the touch gesture to the controller 1300. The touch screen module 1720 according to some embodiments of the disclosure may identify and analyze touch code. The touch screen module 1720 may be configured as separate hardware, including a controller.

The notification module 1730 may generate a signal for notifying the occurrence of an event of the device 1000. Examples of events occurring in the device 1000 include call signal reception, message reception, key signal input, schedule notification, and the like.

The embodiments of the disclosure set forth herein may be implemented as a software (S/W) program including instructions stored in a computer-readable storage medium.

The computer refers to a device capable of calling an instruction stored in a storage medium and operating according to the called instruction according to the embodiments of the disclosure set forth herein, and may include an image transmission device and an image receiving device according to the embodiments of the disclosure set forth herein.

The computer-readable storage medium may be provided as a non-transitory storage medium. Here, the term 'non-transitory storage medium' should be understood to mean a tangible device and to not include a signal (e.g., electromagnetic waves) but is not intended to distinguish between a case in which data is semi-permanently stored in the storage medium and a case in which data is temporarily stored in the storage medium. For example, the 'non-transitory storage medium' may include a buffer in which data is temporarily stored.

Electronic devices or methods according to the embodiments of the disclosure set forth herein may be provided by being included in a computer program product. A computer program product may be traded as a product between a seller and a purchaser.

The computer program product may include an S/W program and a computer-readable storage medium storing the S/W program. For example, the computer program product may include a product (e.g., a downloadable application) in the form of an S/W program distributed electronically by the manufacturer of an electronic device or through an electronic market (e.g., Google Play Store or App Store). For electronic distribution of the computer program product, at least part of the S/W program may be stored in a storage medium or temporarily generated. In this case, the storage medium may be a storage medium of a server of the manufacturer, a server of the electronic market, or a storage medium of a relay server that temporarily stores the S/W program.

The computer program product may include a storage medium of a server or a storage medium of a UE in a system consisting of the server and the UE (e.g., an image transmitting device or an image receiving device). Alternatively, when there is a third device (e.g., a smart phone) capable of establishing communication with the server or the UE, the computer program product may include a storage medium of the third device. Alternatively, the computer program product may include a S/W program transmitted from the server to the UE or the third device or transmitted from the third device to the UE.

In this case, the server, the UE, or the third device may execute the computer program product to perform the methods according to the embodiments of the disclosure set forth herein. Alternatively, two or more among the server, the UE, and the third device may execute the computer program product to the methods according to the embodiments of the disclosure set forth herein in a distributed manner.

For example, the server (e.g., a cloud server or an artificial intelligence server) may execute the computer program product stored in the server to control the UE connected thereto through communication to perform the methods according to the embodiments of the disclosure set forth herein.

As another example, the third device may execute the computer program product to control the UE connected thereto to perform the methods according to the embodiments of the disclosure set forth herein. As a concrete example, the third device may remotely control an image transmitting device or an image receiving device to transmit or receive a packing image.

When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a first device which performs ranging by using an ultra-wide band (UWB), the method comprising:

performing ranging with a second device in a first ranging round among a plurality of ranging rounds included in a first ranging block;

determining whether to perform hopping, based on a result of the performing of the ranging;

when it is determined to perform the hopping, determining an index of a second ranging round for performing the ranging with the second device, based on a random-number generation function; and performing the ranging with the second device in the second ranging round of a second ranging block, wherein an index of the first ranging round and the index of the second ranging round are different values.

2. The method of claim 1, wherein the determining of the index of the second ranging round comprises determining the index of the second ranging round, based on a result value of the random-number generation function determined based on an index of the second ranging block and a value of a hopping key for a ranging session.

3. The method of claim 2, wherein the random-number generation function comprises a hash function, and wherein the determining of the index of the second ranging round comprises determining the index of the second ranging round, based on a result value of the hash function for a sum of the index of the second ranging block and the value of the hopping key for the ranging session.

4. The method of claim 2, wherein the random-number generation function comprises at least one of Advanced Encryption Standard 128, Secure Hash Algorithm 1, Message-Digest algorithm 5, Cyclic redundancy check 32, Linear congruential generator, or linear-feedback shift register.

5. The method of claim 2, further comprising transmitting, by the first device, the hopping key for the ranging session.

6. The method of claim 1, wherein the determining of the index of the second ranging round comprises determining the index of the second ranging round, based on at least one of a scrambled timestamp sequence (STS) code for a certain slot of the first ranging block or the number of ranging rounds included in a ranging block.

7. The method of claim 1, further comprising, when it is determined to perform hopping, transmitting information about a ranging round to the second device so as to instruct to perform hopping in the second ranging block.

8. The method of claim 1, wherein the determining of whether to perform the hopping, based on the result of the performing of the ranging, comprises determining, by the first device, that the hopping is to be performed when a response is not received from the second device in the first ranging round.

9. The method of claim 1, wherein the determining of whether to perform the hopping, based on the result of the performing of the ranging, comprises determining to perform the hopping, based on an interference level for the first ranging round.

10. A method of operating a second device which performs ranging by using an ultra-wide band (UWB), the method comprising:

performing ranging with a first device in a first ranging round among a plurality of ranging rounds included in a first ranging block;

determining whether to perform hopping, based on at least one of a result of the performing of the ranging or information about a ranging round received from the first device;

when it is determined to perform the hopping, determining an index of a second ranging round for performing ranging with the first device, based on a random-number generation function; and performing ranging with the first device in the second ranging round of a second ranging block, wherein an index of the first ranging round and the index of the second ranging round are different values.

11. The method of claim 10, wherein the determining of the index of the second ranging round comprises determining the index of the second ranging round, based on a result value of the random-number generation function determined based on an index of the second ranging block and a value of a hopping key for a ranging session.

12. The method of claim 11, wherein the random-number generation function comprises at least one of Advanced Encryption Standard 128, Secure Hash Algorithm 1, Message-Digest algorithm 5, Cyclic redundancy check 32, Linear congruential generator, or linear-feedback shift register.

13. The method of claim 11, further comprising receiving, by the second device, the hopping key for the ranging session from the first device.

14. The method of claim 11, wherein the information about the ranging round comprises at least one of index information of the second ranging round, or hopping mode information.

15. The method of claim 14, wherein the determining of whether to perform the hopping comprises:

identifying the hopping mode information included in the information about the ranging round; and determining whether to perform the hopping, based on the hopping mode information.

16. The method of claim 11, wherein the determining of whether to perform the hopping comprises determining, by the second device, that hopping is to be performed when a response is not received from the first device in the first ranging round.

17. A first device which performs ranging by using an ultra-wide band (UWB), the first device comprising:

a communicator;

a memory; and at least one processor configured to:

execute a program stored in the memory to control operations of the first device, perform ranging with a second device in a first ranging round among a plurality of ranging rounds included in a first ranging block, determine whether to perform hopping, based on a result of the performing of the ranging, when it is determined to perform the hopping, determine an index of a second ranging round for performing ranging with a second device, based on a random-number generation function, and perform ranging with the second device in the second ranging round of a second ranging block, wherein an index of the first ranging round and the index of the second ranging round are different values.

18. The first device of claim 17, wherein the at least one processor is further configured to determine the index of the second ranging round, based on a result value of the random-number generation function determined based on an index of the second ranging block and a value of a hopping key for a ranging session.

19. The first device of claim 17, wherein the random-number generation function comprises at least one of Advanced Encryption Standard 128, Secure Hash Algorithm 1, Message-Digest algorithm 5, Cyclic redundancy check 32, Linear congruential generator, or linear-feedback shift register.

20. The first device of claim 17, wherein the at least one processor is further configured to transmit information about a ranging round to the second device so as to instruct to perform hopping in the second ranging block, when it is determined to perform hopping.

* * * * *